United States Patent
Sunakawa et al.

[11] Patent Number: 5,828,568
[45] Date of Patent: Oct. 27, 1998

[54] INFORMATION PROCESSING APPARATUS, PROCESSING METHOD THEREOF, AND POWER SUPPLY CONTROL METHOD THEREFOR

[75] Inventors: Shinichi Sunakawa, Kawasaki; Kazutoshi Shimada, Yokosuka; Eisaku Tatsumi, Kawasaki; Shigeki Mori, Koshigaya; Kazuhiro Matsubayashi; Takashi Harada, both of Yokohama; Katsuhiko Nagasaki, Ichikawa; Ryoji Fukuda, Yokohama, all of Japan

[73] Assignee: Canon Kabushiki Kaisha, Tokyo, Japan

[21] Appl. No.: 932,466

[22] Filed: Sep. 18, 1997

Related U.S. Application Data

[63] Continuation of Ser. No. 434,984, May 4, 1995, abandoned.

[30] Foreign Application Priority Data

| May 9, 1994 | [JP] | Japan | 6-095186 |
| Jun. 20, 1994 | [JP] | Japan | 6-136953 |

[51] Int. Cl.⁶ ............................ G05B 9/02; G06F 1/32
[52] U.S. Cl. .................. 364/184; 364/492; 395/750.03
[58] Field of Search ................. 364/176, 184, 364/492, 707; 395/750.01, 750.03, 750.05, 750.06

[56] References Cited

U.S. PATENT DOCUMENTS

| 3,842,249 | 10/1974 | Geyer et al. | 235/151.21 |
| 4,612,518 | 9/1986 | Takeda et al. | 179/81 R |
| 5,218,704 | 6/1993 | Watts, Jr. et al. | 395/750 |
| 5,481,733 | 1/1996 | Douglis et al. | 395/750 |
| 5,483,656 | 1/1996 | Oprescu et al. | 395/750 |
| 5,511,203 | 4/1996 | Wisor et al. | 395/750 |

FOREIGN PATENT DOCUMENTS

| 0 501 655 A2 | 9/1992 | European Pat. Off. . |
| WO 94/11801 | 5/1994 | WIPO . |

OTHER PUBLICATIONS

U.S. Patent application 08/239,543, Shimada et al., May 9, 1994.

*Primary Examiner*—Paul P. Gordon
*Attorney, Agent, or Firm*—Fitzpatrick, Cella, Harper & Scinto

[57] ABSTRACT

An information processing apparatus, which operates in a multi-task mode, calculates a total consumption power of devices used by each task, and assigns higher execution priority to a task which uses a device with the largest consumption power, thereby shortening the execution time of the device with the largest consumption power, and suppressing the total consumption power of the apparatus. When a device is started upon switching of tasks, if the total consumption power exceeds the allowable power of the apparatus by a power consumed upon restarting of the device, the task is set in a waiting state until operations of other devices are completed, the consumption power is lowered, and it is ready to use the device by the task.

32 Claims, 25 Drawing Sheets

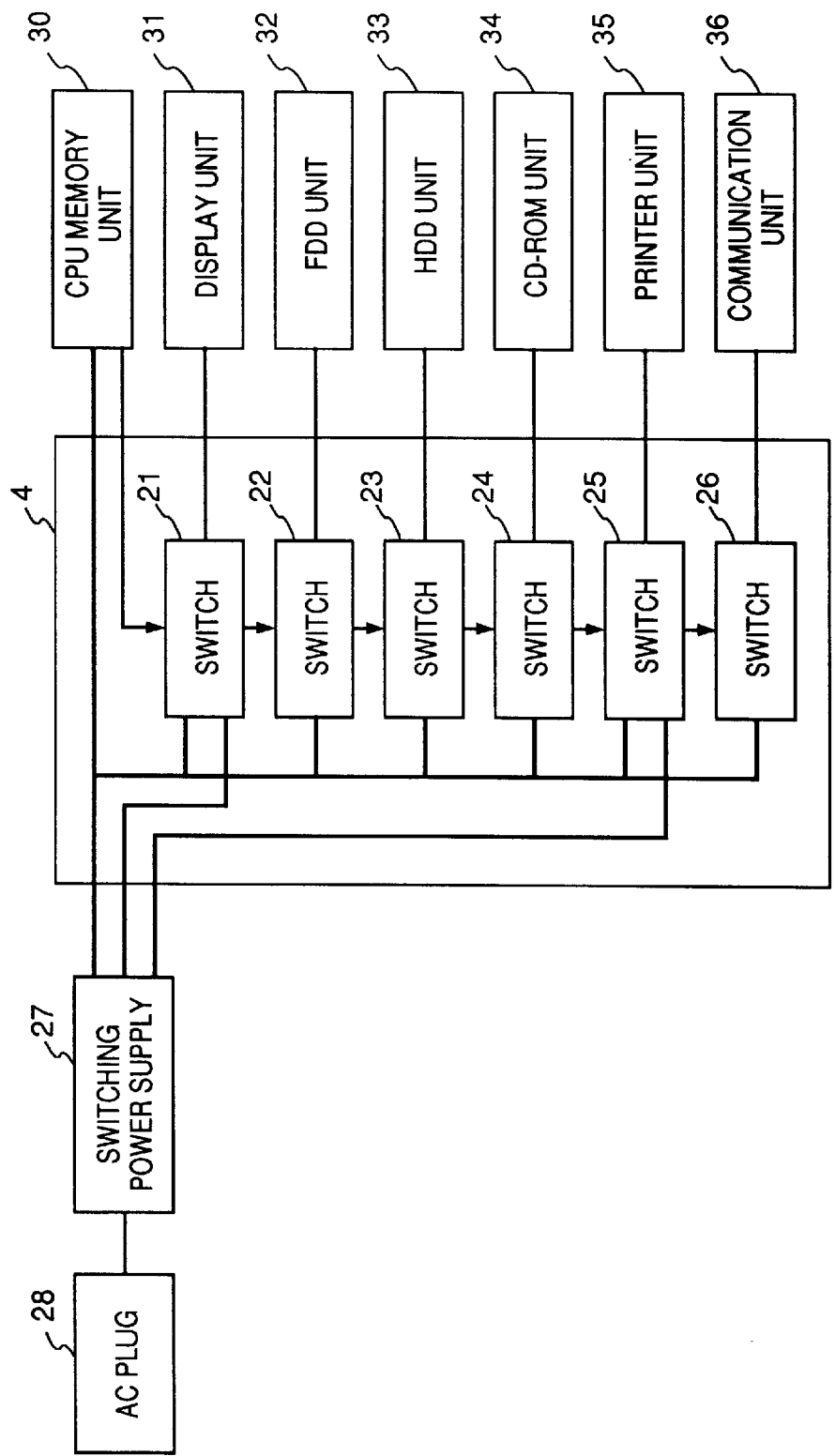

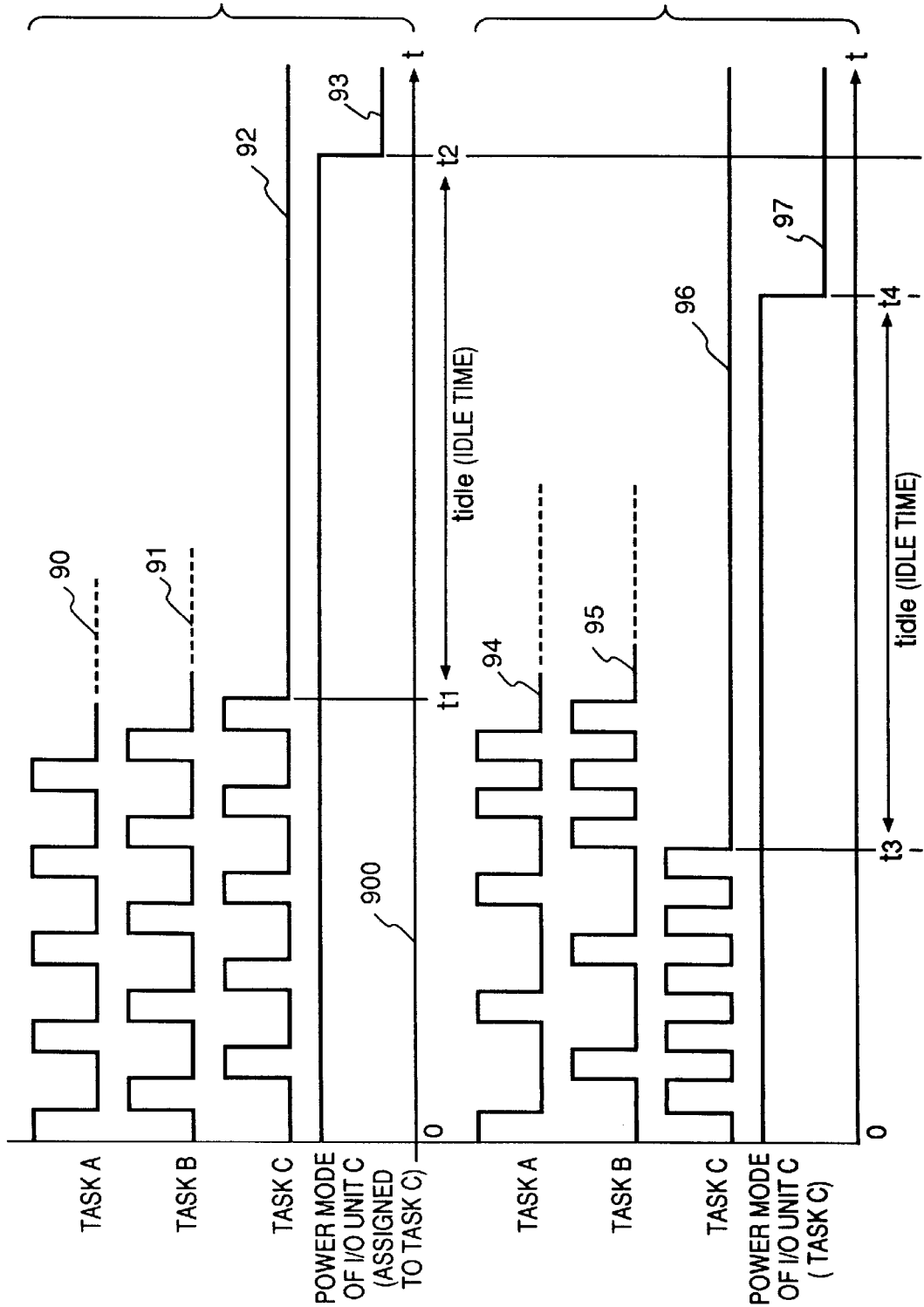

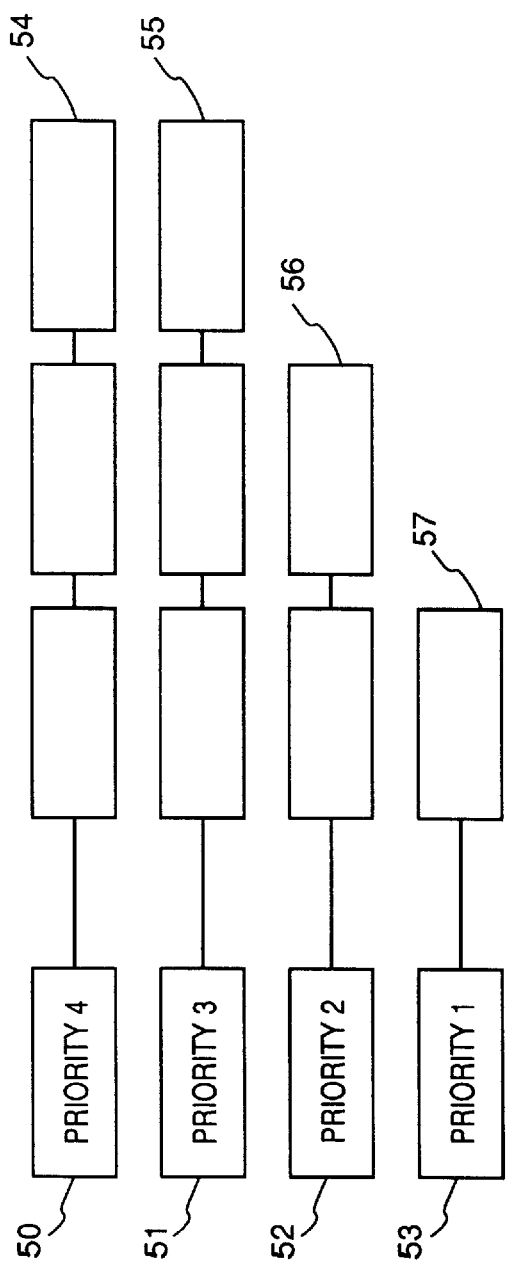

FIG. 8A

| DEVICE ID | CONSUMPTION POWER | ACQUIRED TIME | TASK ID |
|---|---|---|---|
| 0AH | 80 | 11 : 30"30 | ITSELF |
| 10H | 150 | 11 : 28"10 | ITSELF |
| 03H | 500 | 11 : 31"45 | 30H |
| ⋮ | ⋮ | ⋮ | ⋮ |

| TOTAL CONSUMPTION POWER |
|---|
| 730 |

| SET PRIORITY | 100 | 85 |
| POWER CORRECTION VALUE | 20 | 86 |
| CORRECTED PRIORITY | 120 | 87 |

FIG. 20

TIME INTERVAL OF ACCESS TO DEVICE BY APPLICATION (SECONDS)

| DEVICE / APPLICATION | INPUT | OUTPUT | ROM | RAM | HDD | COMMUNICATION |
|---|---|---|---|---|---|---|
| A | 5 | 1 | 1 | 1 | 20 | 3600 |
| B | 120 | 10 | 1 | 1 | 30 | 3600 |
| C | 60 | 1 | 1 | 1 | 30 | 10 |
| D | 180 | 60 | 30 | 30 | 300 | 60 |
| E | 300 | 360 | 60 | 60 | 1800 | 3600 |

FIG. 21

END TIME OF PREVIOUS ACCESS TO DEVICE BY APPLICATION (SECONDS)

| DEVICE / APPLICATION | INPUT | OUTPUT | ROM | RAM | HDD | COMMUNICATION |
|---|---|---|---|---|---|---|
| A | 3599 | 3599 | 3599 | 3599 | 3592 | 0 |
| B | 3490 | 3590 | 3599 | 3599 | 3580 | 0 |
| C | 3530 | 3599 | 3599 | 3599 | 3590 | 3590 |
| D | 3440 | 3520 | 3585 | 3586 | 3350 | 3520 |
| E | 3250 | 3250 | 3560 | 3560 | 1800 | 0 |

FIG. 24

HISTORY OF t3 - t2
WHEN APPLICATION A ACCESS HDD

| ACCESS COUNT | t3 -t2 (SECONDS) |
|---|---|
| 1 | 22 |
| 2 | 12 |
| 3 | 17 |
| 4 | 24 |
| 5 | 21 |
| 6 | 6 |
| 7 | 13 |
| 8 | 23 |
| 9 | 8 |
|  |  |

FIG. 25

ACCESS TIME INTERVAL OF HDD (SECONDS)

|  |  | FILE | |
|---|---|---|---|
|  |  | OPEN | CLOSE |
| VIRTUAL MEMORY | ON | 6 | 20 |
|  | OFF | 10 | 300 |

INFORMATION PROCESSING APPARATUS, PROCESSING METHOD THEREOF, AND POWER SUPPLY CONTROL METHOD THEREFOR

This application is a continuation of application Ser. No. 08/434,984 filed May 4, 1995 now abandoned.

BACKGROUND OF THE INVENTION

The present invention relates to an information processing apparatus, which can time-divisionally switch and execute a plurality of applications or tasks, a processing method of the apparatus, and a power supply control method for the apparatus.

Some electronic apparatuses which incorporate microcomputers and the like have a so-called power-down function of shutting down a power supply or operating the apparatuses in a low-consumption power mode when a memory, a display device, and the like are not accessed for a predetermined time.

However, since the conventional power-down function enters a power-down mode independently of an application which is being currently executed when no access is made for a predetermined period of time, even a device which is not necessary for the currently executed application enters the power-down mode only after an elapse of the predetermined period of time. Therefore, the consumed power and delay time required before the beginning of the power-down mode are wasted.

As will be described later with reference to FIG. 19, some devices require higher power than in a normal mode upon transition to a low-power mode or transition from a low-power mode to a high-power mode. In this case, when a given device enters the low-power mode after an elapse of a predetermined period of time from the last access thereto, and resumes the high-power mode by an access immediately after the beginning of the low-power mode, the consumption power required when the device is kept in the high-power mode during this interval becomes lower than that required when the device is switched between the two power modes.

Conventionally, information processing apparatuses which can execute multi-task processing are known. Each of these information processing apparatuses can apparently execute a plurality of parallel processing operations by executing the multi-task processing for time-divisionally executing a plurality of processing operations. With this processing, a single user can simultaneously execute a plurality of applications. When a plurality of terminals are connected to such an information processing apparatus, a plurality of users can simultaneously use the information processing apparatus.

An operating system (OS) which executes the above-mentioned multi-task processing includes a processing unit (program) called a scheduler. The scheduler determines a task to be executed when a plurality of tasks are executable. Non-allocated tasks are queued and are not processed until the next allocation time. Such a scheduling method includes round robin scheduling, priority scheduling, and the like.

In the round robin scheduling, queued tasks are managed in the form of a first-in-first-out (FIFO) list and are executed in the order of the list. In this method, a task whose allocation time to a CPU has passed is added to the end of the list.

In the priority scheduling, the following method is realized.

In a method of determining priority in correspondence with the execution levels of tasks, if there are a user level at which a program created by a user operates and a privileged level at which the OS operates, a higher priority level is assigned to a task with the privileged level. Also, a method of assigning a higher priority level to a task with a strict limitation on its execution time such as a dynamic image reproduction task, a method of determining priority in correspondence with the qualifications of user IDs, a method of determining priority in correspondence with the ratio of the busy time in the allocation time to a CPU, and the like are known.

In general, tasks with the same priority levels are classified to some ranks, so that the priority scheduling is adopted to manage tasks in each rank, and the round robin scheduling is adopted to manage tasks in units of ranks.

On the other hand, in these information processing apparatuses, processing circuits must operate at high speeds to execute a plurality of processing operations parallel to each other. As a result, consumption power increases, and the temperatures of these circuits become very high during operation. Since such an information processing apparatus includes many I/O devices, a large amount of heat is also generated by these I/O devices. The heat causes operation errors of the apparatus, and deteriorates the reliability of the apparatus. For this reason, it is important to reduce consumption power to suppress heat generation.

A method of reducing consumption power realized in, e.g., a personal computer as an example of the information processing apparatus will be described below. In general, the following four methods are popularly adopted.

(1) The number of circuits to which DC power is applied is reduced.
(2) The operation voltage of each circuit is lowered.
(3) The operation frequency of each circuit is lowered.
(4) The operation of a circuit which is not being used is stopped.

The method (4) will be described below. A time elapsed after the last operation of a circuit is measured. When the next operation of the circuit is not started for a predetermined period of time, it is determined that the circuit is not being used, and the operation of the circuit is stopped or a power supply to the circuit is shut down. With the above-mentioned operation, consumption power can be reduced.

However, the above-mentioned method may impair operability since the operation of the apparatus is often stopped while a user uses the apparatus. When the threshold value of the predetermined period of time is set to be large, the operability can be prevented from being impaired, but the effect of reducing consumption power becomes insufficient. For this reason, the setting time is determined based on a trade-off between the operability and consumption power.

However, the above-mentioned prior art suffers the following problems.

When the number of tasks which are apparently simultaneously executed by the time-divisional processing is large, the waiting time of each task is prolonged, and the apparent execution time of each task is prolonged. In this case, the waiting time corresponds to a waiting time during which an I/O resource acquired by the task is not used. However, since this waiting time is very short when viewed from a single task, and corresponds to a total of the waiting times in units of tasks, power-saving control described in the prior art cannot be performed. Therefore, in these waiting times, power is wastefully consumed by I/O resources. That is, when the number of tasks is large, the waiting time of the I/O resources is prolonged, resulting in wasteful consumption power.

In the prior art, tasks are uniquely controlled by the scheduler independently of the consumption powers of I/O resources. For this reason, when a task which acquires an I/O resource requiring large power is queued for a long period of time, very large power is wastefully consumed for the long period of time.

When a plurality of devices must be started simultaneously, a large peak current flows instantaneously. For this reason, the apparatus must be designed to have a power supply with a large capacity, resulting in increases in size and cost of the apparatus.

SUMMARY OF THE INVENTION

The present invention has been made in consideration of the above-mentioned prior art, and has as its object to provide an information processing apparatus, which can operate with minimum consumption power, a processing method of the apparatus, and a power supply control method for the apparatus.

It is another object of the present invention to provide an information processing apparatus, which can minimize the consumption power of the apparatus as a whole since scheduling of tasks is executed to minimize the waiting time of a device requiring large power, a processing method of the apparatus, and a power supply control method for the apparatus.

It is still another object of the present invention to provide an information processing apparatus, which can set an access request from a task to a given device in a waiting state when the overall consumption power exceeds an allowable power of the apparatus upon the access from the task to the device, a processing method of the apparatus, and a power supply control method for the apparatus.

It is still another object of the present invention to provide an information processing apparatus, which can average the consumption power of the overall apparatus by dispersing large consumption power timings of respective devices, a processing method of the apparatus, and a power supply control method for the apparatus.

It is still another object of the present invention to provide an information processing apparatus, which can realize size reduction and cost reduction since it can use a small-capacity power supply, a processing method of the apparatus, and a power supply control method for the apparatus.

It is still another object of the present invention to provide an information processing apparatus which stores hysteresis information of accesses to devices in units of applications, and can optimally execute a power-down function in correspondence with the applications and devices, a processing method of the apparatus, and a power supply control method for the apparatus.

It is still another object of the present invention to provide an information processing apparatus which can suppress consumption power when no access is made, a processing method of the apparatus, and a power supply control method for the apparatus.

It is still another object of the present invention to provide an information processing apparatus, which predicts access times to devices in units of applications, determines based on the predicted times if a power-down function is to be executed, and executes the power-down function in accordance with the determination result, a processing method of the apparatus, and a power supply control method for the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram showing the arrangement of a power supply unit to respective I/O units in the information processing apparatus of the embodiment shown in FIG. 1;

FIGS. 5A and 5B are timing charts for explaining a power-saving control state of the information processing apparatus of the embodiment shown in FIG. 1;

FIG. 6 is a view for explaining priority control of a task scheduler in the information processing apparatus of the embodiment shown in FIG. 1;

FIGS. 8A to 8C are tables showing the contents of the task control block in the information processing apparatus of the embodiment shown in FIG. 1;

FIG. 20 shows an example of an access time interval table of the third embodiment;

FIG. 21 shows an example of an access time table of the third embodiment;

FIG. 24 shows an example of a table for storing the hysteresis of access times of an application A to an HDD in the fourth embodiment of the present invention;

FIG. 25 shows an example of an HDD access time interval table in the fifth embodiment of the present invention.

DESCRIPTION OF THE PREFERRED EMBODIMENTS

The preferred embodiments of the present invention will be described in detail hereinafter with reference to the accompanying drawings.

The important points of an information processing apparatus of this embodiment will be summarized below.

In an information processing apparatus which can time-divisionally execute a plurality of processing operations, the total power required by hardware resources used by each task is detected, and an operation attribute of the task is determined on the basis of the total power. More specifically, hardware resources acquired by each task, and the total power required by these hardware resources are detected, and as the task has a larger total power of the acquired hardware resources, a higher execution priority level is assigned to the task. A scheduler of an operating system selects a task with a high execution priority level, and gives the right of execution to the task.

An information processing method and apparatus, which can delay the execution timing of a task corresponding to a start request of a new device when a plurality of hardware resources must be started simultaneously are provided.

An information processing method and apparatus which can execute high-speed multi-task processing while minimizing consumption power by the above-mentioned processing are provided.

<Description of Arrangement of Information Processing Apparatus>

The schematic arrangement of an information processing apparatus of this embodiment will be described below with reference to FIG. 1. As the information processing apparatus of this embodiment, a work station which can be accessed by a plurality of terminals, and incorporates peripheral input/output devices will be exemplified.

Figure 1:
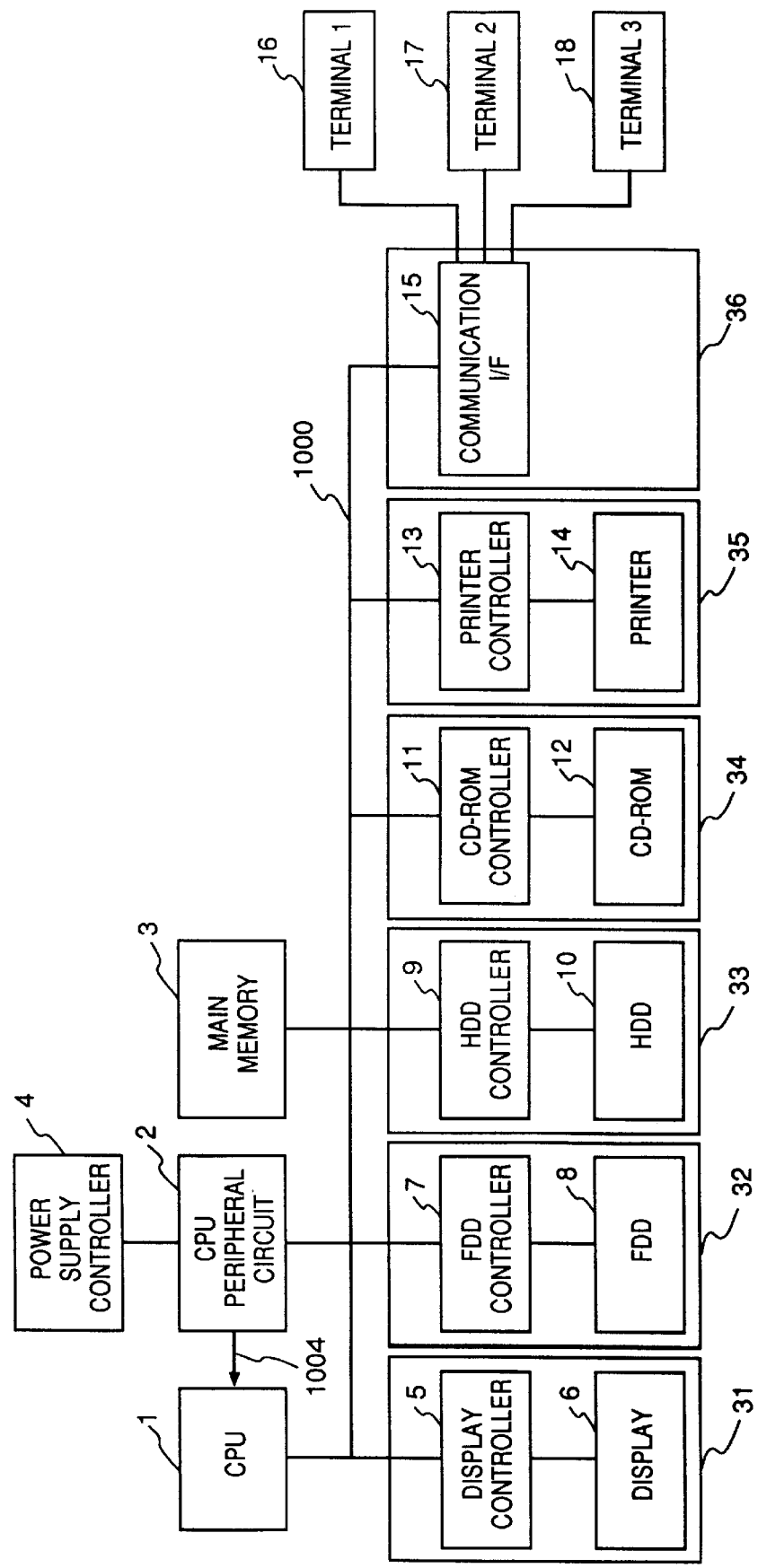
FIG. 1 is a schematic block diagram showing the arrangement of an information processing apparatus according to an embodiment of the present invention.
Figure 2:
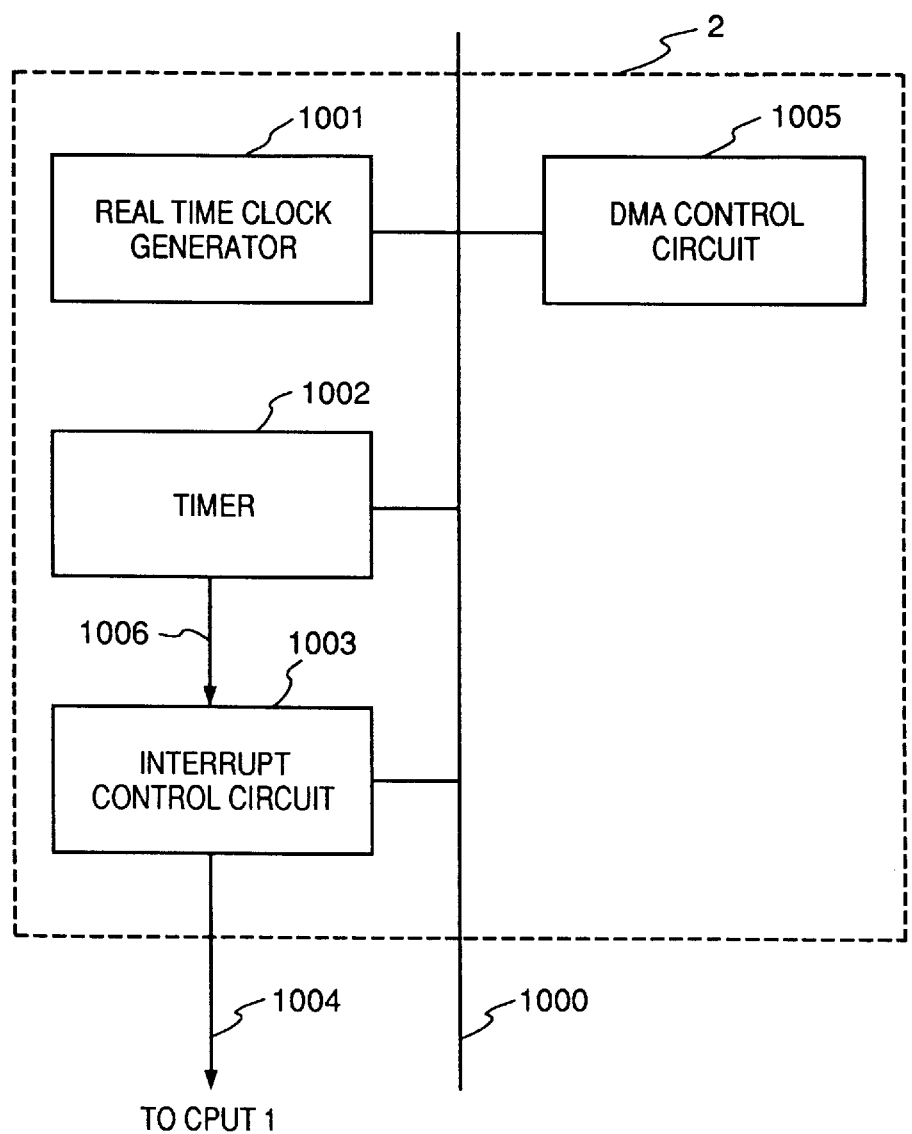
FIG. 2 is a block diagram showing the arrangement of CPU peripheral circuits in the information processing apparatus of the embodiment shown in FIG. 1.

Referring to FIG. 1, reference numeral 1 denotes a CPU for controlling the entire information processing apparatus. The CPU 1 executes processing such as arithmetic operations, I/O control, and the like in accordance with a program stored in a main memory 3. A CPU peripheral circuit 2 includes a real time clock generator 1001, a timer 1002, an interrupt control circuit 1003, and a processing circuit required for controlling a peripheral device such as a DMA control circuit 1005, as shown in FIG. 2, and controls the respective units under the control of the CPU 1. FIG. 2 shows the arrangement of the CPU peripheral circuit 2. Referring to FIG. 2, when the timer 1002 detects an elapse of a predetermined period of time, it outputs an interrupt request signal 1006 to the interrupt control circuit 1003. The interrupt control circuit 1003 outputs an interrupt signal 1004 to the CPU 1 on the basis of the signal 1006.

Referring back to FIG. 1, the main memory 3 includes memories such as a DRAM, a cache RAM, a ROM, and the like, and receives power from, e.g., a battery even in a non-use state of the apparatus of this embodiment, so that its storage contents are held. Reference numeral 4 denotes a power supply controller for turning on/off a power supply in accordance with an instruction from the CPU 1.

As will be described in detail later, in the information processing apparatus of this embodiment, a power supply voltage is independently supplied to each unit, and the power supply can be turned on/off for each unit. The unit arrangement of this embodiment is as follows. That is, reference numeral 31 denotes a display unit; 32, an FDD unit; 33, an HDD unit; 34, a CD-ROM unit; 35, a printer unit; and 36, a communication unit.

In the display unit 31, reference numeral 5 denotes a display controller which sequentially reads out display data from an internal VRAM (not shown), and transfers them to a display 6 such as a CRT while performing gradation conversion and the like of the data. The display controller 5 controls accesses from the CPU 1 to the VRAM, and data transfer from the VRAM to the display 6. The display controller 5 performs bus arbitration to prevent a collision between an access from the CPU 1 to the VRAM and a data transfer access from the VRAM to the display 6. Furthermore, the display controller 5 can perform logic arithmetic operations such as AND, OR, EXOR, and the like between the contents of the VRAM and a predetermined pattern. The display 6 comprises, e.g., a CRT, liquid crystal panel (LCD), or the like.

In the FDD unit 32, reference numeral 7 denotes an FDD controller; and 8, a floppy disk drive. In the HDD unit 33, reference numeral 9 denotes an HDD controller; and 10, a hard disk drive (HDD). In the CD-ROM unit 34, reference numeral 11 denotes a CD-ROM controller; and 12, a CD-ROM drive. In the printer unit 35, reference numeral 13 denotes a printer controller; and 14, a printer. Reference numeral 15 denotes a communication interface (I/F) for performing communications in a high-speed serial format. Reference numerals 16 to 18 denote terminals which are connected to the communication I/F 15 and from which respective users perform input/output operations of information.

The power supply arrangement of this embodiment will be described below with reference to FIG. 3.

A switching power supply 27 converts an AC voltage of a commercial power supply input via an AC plug 28 into voltages (e.g., +5 V for digital circuits, -24 V for driving the display, and +20 V for motor drivers of the respective drives) used in the main body.

In the information processing apparatus of this embodiment, operation power is independently supplied to each unit, and the power supply is turned on/off for each unit, thus saving power. In some units, a power-saving mode is realized by stopping internal clocks or lowering the clock frequency. The unit arrangement of this embodiment also includes a CPU.memory unit 30 constituted by the CPU 1, the CPU peripheral circuit 2, and the main memory 3, and the communication unit 36 constituted by the communication interface 15 in addition to the above-mentioned units.

Note that the power supply to the CPU.memory unit 30 cannot be turned on/off, and this unit is kept ON when the power switch is turned on. The display unit 31 includes the display controller 5 and the display 6. The FDD unit 32 includes the FDD controller 7 and the FDD 8. The HDD unit 33 includes the HDD controller 9 and the HDD 10, and the CD-ROM unit 34 includes the CD-ROM controller 11 and the CD-ROM drive 12. The printer unit 35 includes the printer controller 13 and the printer 14.

Power is supplied to these functional units via switches 21 to 26 included in the power supply controller 4. These switches 21 to 26 have a one-to-one correspondence with the above-mentioned units. When a corresponding switch is turned off, power supply to the unit is stopped, and its processing can also be stopped. The ON/OFF control of these switches is executed by the CPU 1 via the CPU peripheral circuit 2.

Note that these switches may comprise mechanoelectric elements such as electromagnetic relays, lead switches, or the like or may comprise semiconductor switches such as MOS-FETs.

Control of the power mode of the respective device units will be described below with reference to FIGS. 4A and 4B.

In this embodiment, a time elapsed from the last access of each unit is measured. When the next access to the unit is not made within a predetermined period of time, it is determined that the unit is not being used, and the unit is switched to the power-saving mode. For this purpose, a control circuit of each unit comprises a timer for measuring the elapsed time. Upon completion of the measurement of a timer value set in each timer, the timer generates an interrupt signal to the CPU 1. When an access is made to the unit in the power saving mode, the control circuit of the unit detects this access, and performs processing for resuming a function of a portion which has been stopped so far.

In the above description, the control circuit of each unit comprises the timer for measuring the elapsed time. As another method, the timer 1002 (see FIG. 2) may be used. That is, the operating system periodically looks up the measured value of the timer 1002 in real time, and stores execution times corresponding to respective I/O units in the memory 3, thereby measuring the operation times of the respective units.

A processing sequence executed when a certain task which must access one of I/O units is given with the right of execution by the scheduler of the operating system, and accesses a certain I/O unit will be described in detail below.

The task scheduling method and its effect in the information processing apparatus of this embodiment will be described below with reference to FIGS. 5A and 5B.

The operation of this embodiment will be explained below with reference to the timing charts in FIGS. 5A and 5B.

FIG. 5A shows the relationship between the execution states of respective tasks and the operation modes (a normal operation mode and a power-saving mode) of an I/O unit exclusively used by a certain task when the task scheduling method of this embodiment is not used.

In this case, an operation state when there are three tasks (i.e., tasks A, B, and C) which are virtually simultaneously executed will be explained with reference to FIG. 5A. FIG. 5A exemplifies a case wherein the task C exclusively occupies a certain I/0 unit (to be referred to as an I/O unit C hereinafter) until its processing is completed. Assume that a scheduler equally assigns the right of execution to these tasks in scheduling for executing these tasks. A task assigned with the right of execution occupies the CPU machine cycle, and executes predetermined processing.

An abscissa 900 in FIG. 5A represents the time base, and time elapses from the left to the right in FIG. 5A. Reference numerals 90, 91, and 92 denote the execution timings of the tasks A, B, and C. In the execution timings 90 to 92, each task is executed at the timing of high (H) level, and is queued at low (L) level. In this chart, an overhead time required for, e.g., the task switching time of the scheduler is not shown. Reference numeral 93 denotes a change in power mode of an I/O unit incorporated in the apparatus. When the power mode 93 is at H level, the I/O unit C is set in the normal operation mode for performing a normal operation, and continues to be in an operation waiting state when no access is made. When the power mode 93 is at L level, the I/O unit C is set in a so-called power-saving mode in which operations of some circuits are stopped. The control circuit of the I/O unit C incorporates an idle timer C. The idle timer C starts time measurement, i.e., measurement of an idle time each time an access from the task C is completed.

If the measured idle time has reached t (idle time) as a predetermined threshold value, the control circuit controls the I/O unit C to be switched to the power-saving mode.

Referring to FIG. 5A, the task C exclusively acquires the I/O unit C, and is executing its processing. In the timing chart of FIG. 5A, the access to the I/O unit C is completed after execution of five processing operations. In FIG. 5A, when the fifth (last) processing ends at time t1, the task C releases the I/O unit C and ends its processing. Thus, at time t1, the idle timer C of the I/O unit C starts counting. If the I/O unit C is not accessed from time t1 until an elapse of t (idle time), the idle timer C stops counting, and switches the I/O unit C to the power-saving mode (time t2). If another task accesses the I/O unit C during counting of the idle timer C, the idle timer C is reset by each access.

The operation timings of tasks and transitions of the operation modes of the I/O unit C exclusively controlled by the task C when task scheduling is performed based on the consumption power of each I/O unit used by each task of this embodiment will be explained below with reference to FIG. 5B.

In FIG. 5B, the task arrangement and the expression method of the chart are the same as those in FIG. 5A.

In this task scheduling method, task scheduling is performed in such a manner that the total consumption power of I/O units used by tasks is calculated, the total consumption powers of the I/O units used are compared in units of tasks, and priority of execution is assigned to a task which uses an I/O unit with a large consumption power. In FIG. 5B, the total consumption power value of the I/O unit C used by the task C is larger than those used by other tasks. For this reason, since the task scheduler assigns highest priority to the task C, the execution frequency of the task C becomes higher than those of the tasks A and B.

In FIG. 5B, upon completion of the fifth execution of the task C at time t3, the task C releases the I/O unit C and ends its processing. At time t3, the idle timer C of the I/O unit C starts counting of an idle time. After an elapse of t (idle time), in which the I/O unit C is not accessed, from time t3, the idle timer C stops counting, and the I/O unit C is switched to the power-saving mode (time t4).

Upon comparison of times required until the I/O unit C is switched to the power-saving mode with reference to FIGS. 5A and 5B, control for switching the unit C to the power-saving mode is made at time t4 in FIG. 5B, while control for switching the unit C to the power-saving mode is made at time t2 later than time t4 in FIG. 5A.

With the control of this embodiment, since the processing time of a task which uses an I/O unit with a large consumption power can be shortened by a time (t2–t4), power consumed by the I/O unit during this time interval can be saved.

Figure 4A:
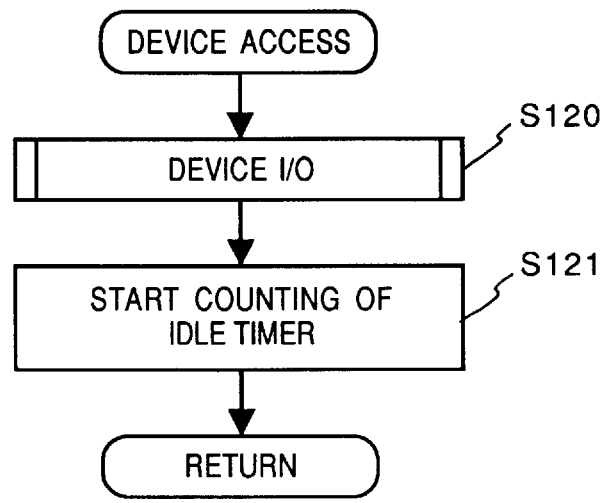
FIGS. 4A and 4B are flow charts respectively showing device I/O control and interrupt control upon completion of time measurement by a timer in the information processing apparatus of the embodiment shown in FIG. 1.

FIG. 4A is a flow chart showing the flow of processing in which a task assigned with the right of execution by the scheduler inputs/outputs data via each I/O unit (to be simply referred to as a device hereinafter).

In step S120, data I/O processing with a predetermined device is performed. In step S121, an idle timer corresponding to the device is initialized, and starts counting. This processing ends, and the flow returns to the processing step of a host processing program which called this routine.

Figure 4B:
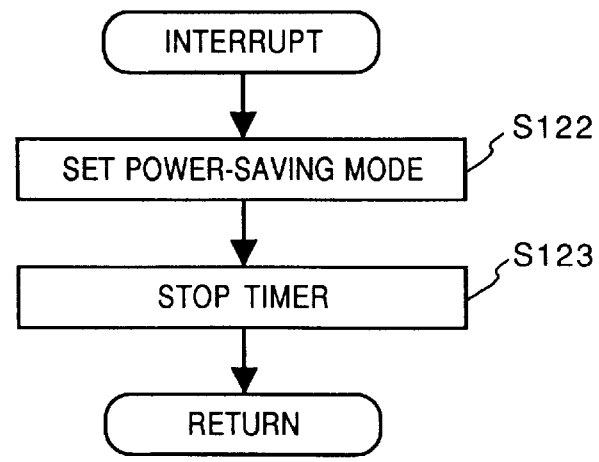

On the other hand, FIG. 4B is a flow chart showing the flow of the processing of the interrupt processing routine started upon completion of counting of the idle timer.

In step S122, the device corresponding to the idle timer which has completed counting is switched to the power-saving mode. In step S123, the time measurement by the idle timer is stopped. This processing ends, and the flow returns from this routine to the main routine.

With the above-mentioned control, the power mode of each device can be switched.

<Description of Arrangement of Operating System>

The arrangement of the operating system of the information processing apparatus of this embodiment will be described below.

The scheduler which realizes multi-task scheduling will be described below with reference to FIG. 6. FIG. 6 is a view for explaining the arrangement of the scheduler of this embodiment.

This scheduler is started each time when a predetermined period of time (e.g., 100 μs) is measured by a timer, and switches tasks to be executed. The schedule control of this embodiment is achieved by priority scheduling while classifying the priority levels of tasks into four ranks. At the same priority level, tasks to be executed are controlled to be switched by the above-mentioned round robin scheduling.

Reference numerals 50 to 53 denote queue headers of the respective priority levels. The queue header 50 with priority level 4 corresponds to the highest priority, and the queue header 53 corresponds to the lowest priority (priority level 1). Queued tasks are coupled to each of the queue headers 50 to 53 of the respective priority levels in a list structure. Reference numerals 54 to 57 denote queued tasks connected to the ends at the respective priority levels.

Each task has a table called a task controller block (TCB), and the operation of each task of this embodiment is controlled in accordance with the TCB. The TCBs of the tasks are linked via a bidirectional list. Queuing of queued tasks used in scheduling is also realized by the bidirectional list of the TCBs.

Figure 7:
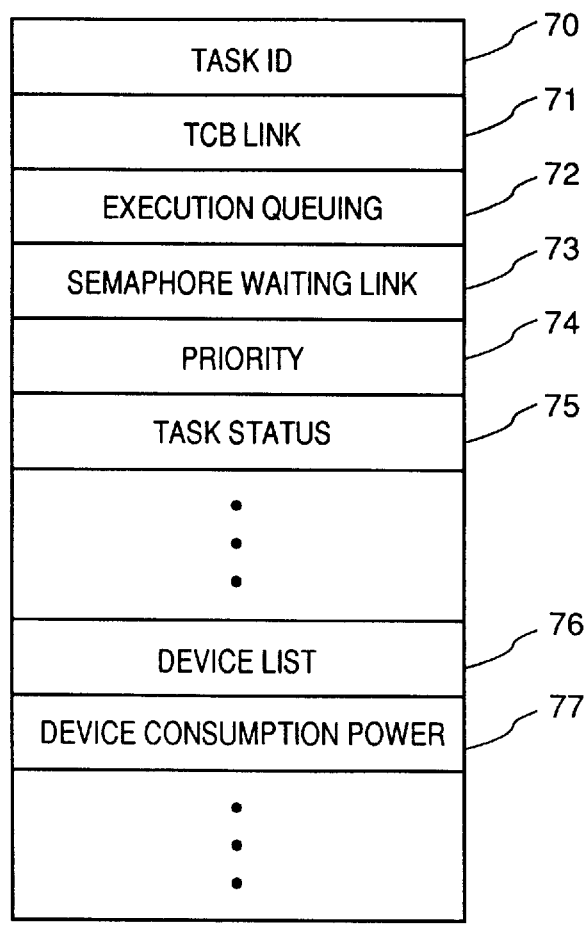
FIG. 7 is a view showing the format of a task control block in the information processing apparatus of the embodiment shown in FIG. 1.

The contents of the TCB will be described below with reference to FIG. 7.

Reference numeral 70 denotes a task ID which is set by the operating system to identify a task. Reference numeral 71 denotes TCB link data for interlinking to the TCBs of other tasks. Reference numeral 72 denotes an execution queue link for linking queued tasks. Reference numeral 73 denotes link data for controlling the semaphore among tasks. Reference numeral 74 denotes queue priority data of the task. Reference numeral 75 denotes task status representing the current task state. The task status 75 includes flags indicating enable/disable, suspend/in-execution, and the like of execution. Reference numeral 76 denotes a device list indicating devices acquired by the task itself and its sub task.

Reference numeral 77 denotes a total consumption power of devices acquired by the task.

The detailed arrangement of the TCB will be described below with reference to FIGS. 8A to 8C.

FIG. 8A shows the arrangement of the device list 76. The device list 76 stores device information acquired by each task, and is updated upon acquisition of a device. In FIG. 8A, reference numeral 80 denotes a device ID for identifying an acquired device. Reference numeral 81 denotes the consumption power of each device. Reference numeral 82 denotes the acquired time of a device. Reference numeral 83 denotes the task ID of a task which acquired a device. Note that a device acquired by a sub task is recorded in the device list of its originating task as well as its own device list.

FIG. 8B shows the storage state of the total consumption power of devices acquired by each task. Reference numeral 84 denotes a storage area of the total consumption power. This area stores a total of device consumption powers 81 in the device list.

FIG. 8C shows the storage state of variables for the priority level. The initial value of the priority level of each task is set by the operating system. The set priority level is corrected in correspondence with the total consumption power of devices used by the task, thereby determining a new priority level. This correction value is calculated based on the following formula:

$$\text{Corrected Priority} = \text{Setting Value} + \text{Power Correction Value} \quad (1)$$

Referring to FIG. 8C, reference numeral 85 denotes a priority level set by the operating system. Reference numeral 86 denotes a power correction value based on the total consumption power of devices acquired by the task. Reference numeral 87 denotes a corrected priority level, which is corrected based on formula (1).

<Description of Processing Operation (FIGS. 9 and 10)>

The flow of processing of this embodiment will be described below with reference to flow charts.

In this embodiment, upon acquisition of the right of use of a device, the device list in each TCB is updated, and the total consumption power is calculated. Furthermore, the priority level is changed in correspondence with the total consumption power.

Figure 9:
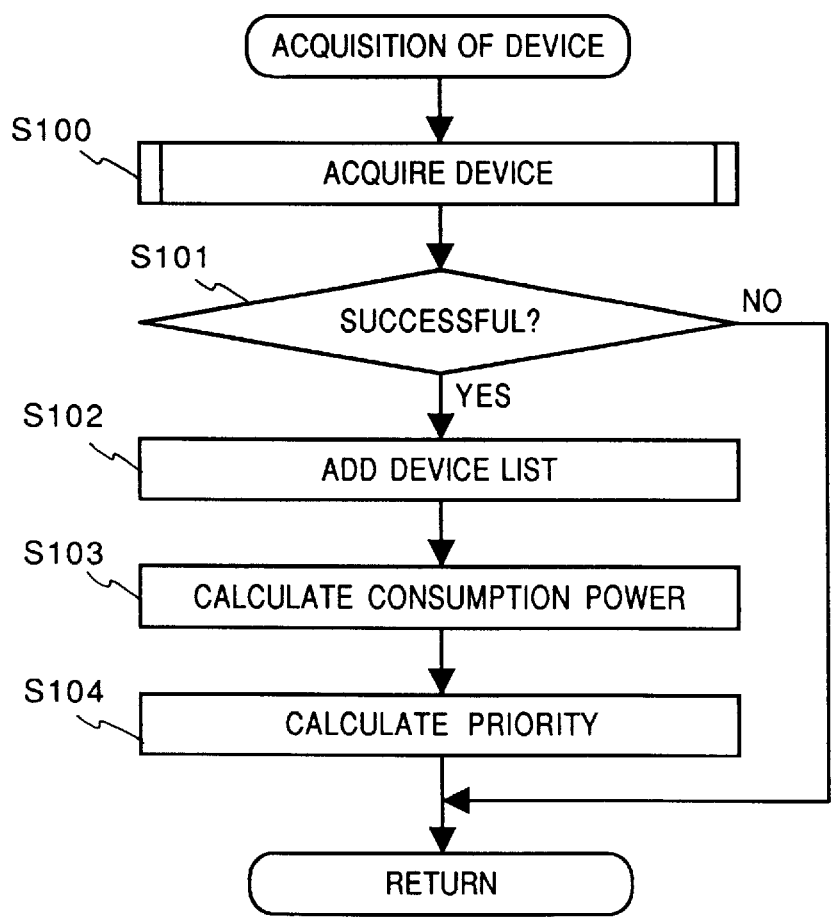
FIG. 9 is a flow chart showing control of I/O device acquisition processing of tasks in an information processing apparatus according to the first embodiment of the present invention.

The processing of a device driver for acquiring each device will be explained below with reference to FIG. 9.

In step S100, device acquisition processing is performed. More specifically, various kinds of information are checked to check if a device to be accessed by a task is ready. In step S101, it is checked if a desired device can be acquired. If YES in step S101, the flow advances to step S102; otherwise, the processing ends. In step S102, the new device acquired in step S100 is added to the device list 76 in the TCB of the task, which issued the acquisition request. In step S103, the consumption power of the acquired device is added to the total consumption power 84. In step S104, the correction value of the priority level is calculated in accordance with the new total consumption power, and the calculation result is stored in the corrected priority level 87. The processing ends, and the flow returns to the processing step of a host processing program which called this routine.

As a method of calculating the above-mentioned priority correction value, for example, the following formula is used:

$$\text{Priority Correction Value} = \text{Total Power} \times k \quad (2)$$

(k: constant)

This calculation method may use a quadratic function or may use an arbitrary function formula.

Furthermore, consumption power values may be classified into a plurality of ranks, and a correction value may be obtained by looking up a separate table. Since higher priority is assigned to a task which uses a device requiring a larger consumption power, the operation time of the device requiring the larger consumption power can be shortened, thus saving power.

Figure 10:
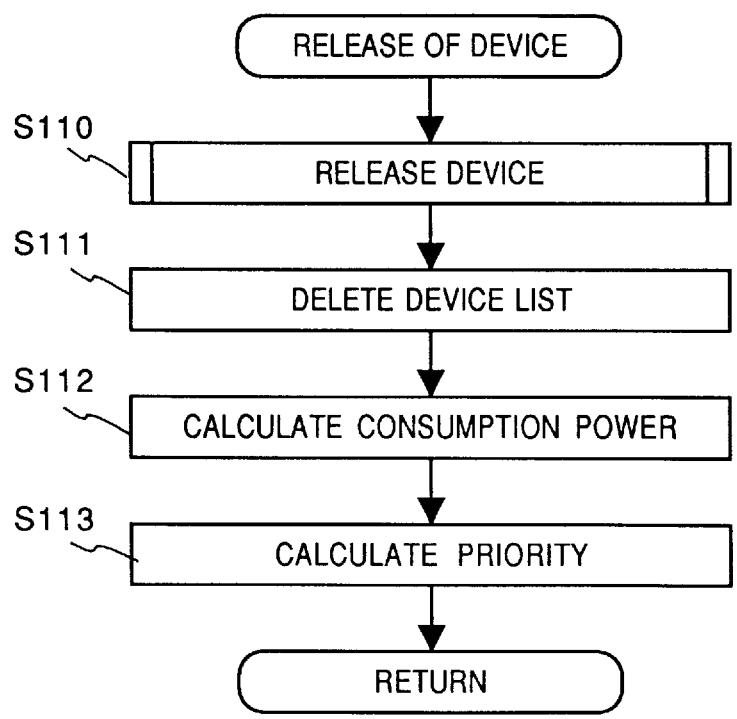
FIG. 10 is a flow chart showing control of I/O device release processing of tasks in the information processing apparatus according to the first embodiment of the present invention.

The flow of processing of a device driver with which a task ends an access to a predetermined device, and releases exclusive occupation of the device will be described below with reference to the flow chart in FIG. 10.

In step S110, device release processing is performed. In step S111, information of the released device is deleted from the acquired device list 76 in the TCB of the task. The flow advances to step S112, and the consumption power of the released device is subtracted from the total consumption power 84. In step S113, the priority correction value is calculated in the same manner as in step S104, and the calculation result is stored. This processing ends, and the flow returns to the processing step of a host processing program which called this routine.

With the above-mentioned processing, the execution priority level of each task can be changed in correspondence with the consumption power of a device used by the task, thus saving the total consumption power.

As described above, according to this embodiment, since the execution priority level of a task is changed in correspondence with the consumption power of a device used by the task, as the device requires a larger consumption power, it can enter power-saving control earlier. For this reason, the overall consumption power can be saved without lowering operability.

In this embodiment, priority control based on the round robin scheduling is corrected. Alternatively, the scheduling of this embodiment may be combined with other priority processing, e.g., an algorithm for dynamically changing priority.

(Second Embodiment)

In the first embodiment described above, the execution priority of each task is changed in correspondence with the consumption power of a device used by the task, thereby shortening the time required until power-saving control is started. In the second embodiment, a case will be explained below wherein a device is resumed from the power-saving mode.

When a device in the power-saving mode is started, a large inrush current temporarily flows. In a multi-task environment, devices requiring large power are often simultaneously restarted, and the consumption power at that time becomes very large. In the second embodiment, the operating states of I/O devices are detected, and when some devices are to be restarted simultaneously, a task which requests restarting of a new device is set in a waiting state.

Since the arrangement of an information processing apparatus of the second embodiment is the same as that of the first embodiment described above, a detailed description thereof will be omitted.

<Description of Processing Operation>

The flow of the overall processing will be explained below.

In the second embodiment, when a given task makes an access to a device in the power-saving mode, the total consumption power of the apparatus at that time is detected, and it is checked if the device can be started. If it is determined that the device can be started, the device is started, and a timer starts time measurement to delay the start of processing of the time until the operation of the device is stabilized. Upon completion of the time measurement by the timer, a command of the task is executed.

On the other hand, if it is determined that the device cannot be started, the status of the task which accesses the device is changed to a waiting state, so that the task waits until completion of use of other devices. Upon completion of use of other devices, a restart routine of the device in the waiting state is called, and the restart operation of the device is started.

Figure 11:
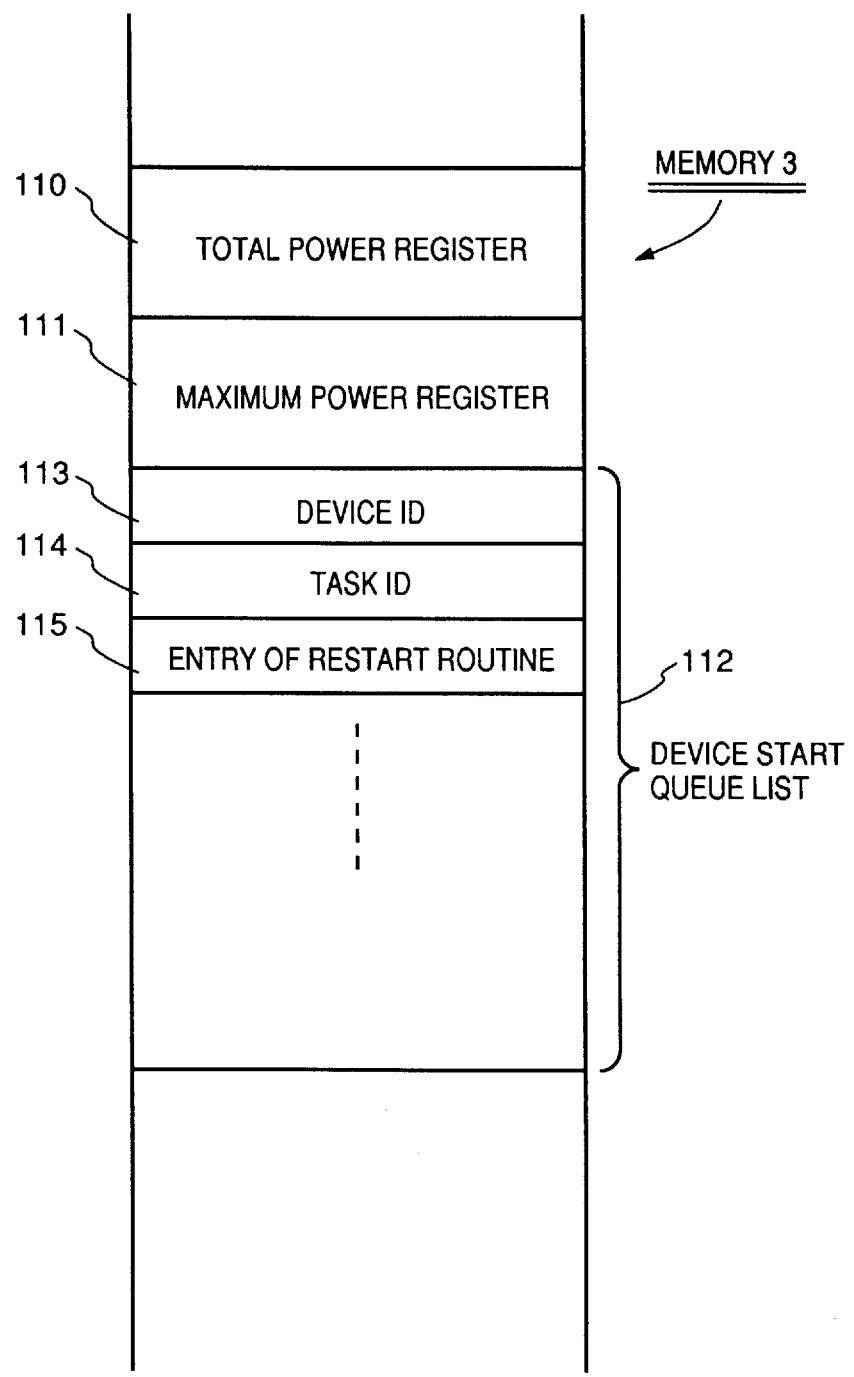
FIG. 11 is a view showing various basic parameters for scheduling used by a task scheduler in an information processing apparatus according to the second embodiment of the present invention.

In order to perform the above-mentioned processing, areas shown in FIG. 11 are allocated in the main memory 3.

A total power register 110 for recording a total consumption power of the apparatus is allocated in a common memory area 3. The consumption power of the entire apparatus is stored in real time when device drivers update the contents of the total power register 110 in correspondence with changes in status. Furthermore, a maximum allowable power register 111 is allocated to indicate power which can be supplied from the power supply of the apparatus. In addition, a device start queue list 112 is allocated to manage devices which are waiting for starting. The device start queue list 112 stores an ID 113 of a start queued device, a task ID 114 of a task which issued a restart request, an entry 115 of a restart routine, and the like.

Figure 12:
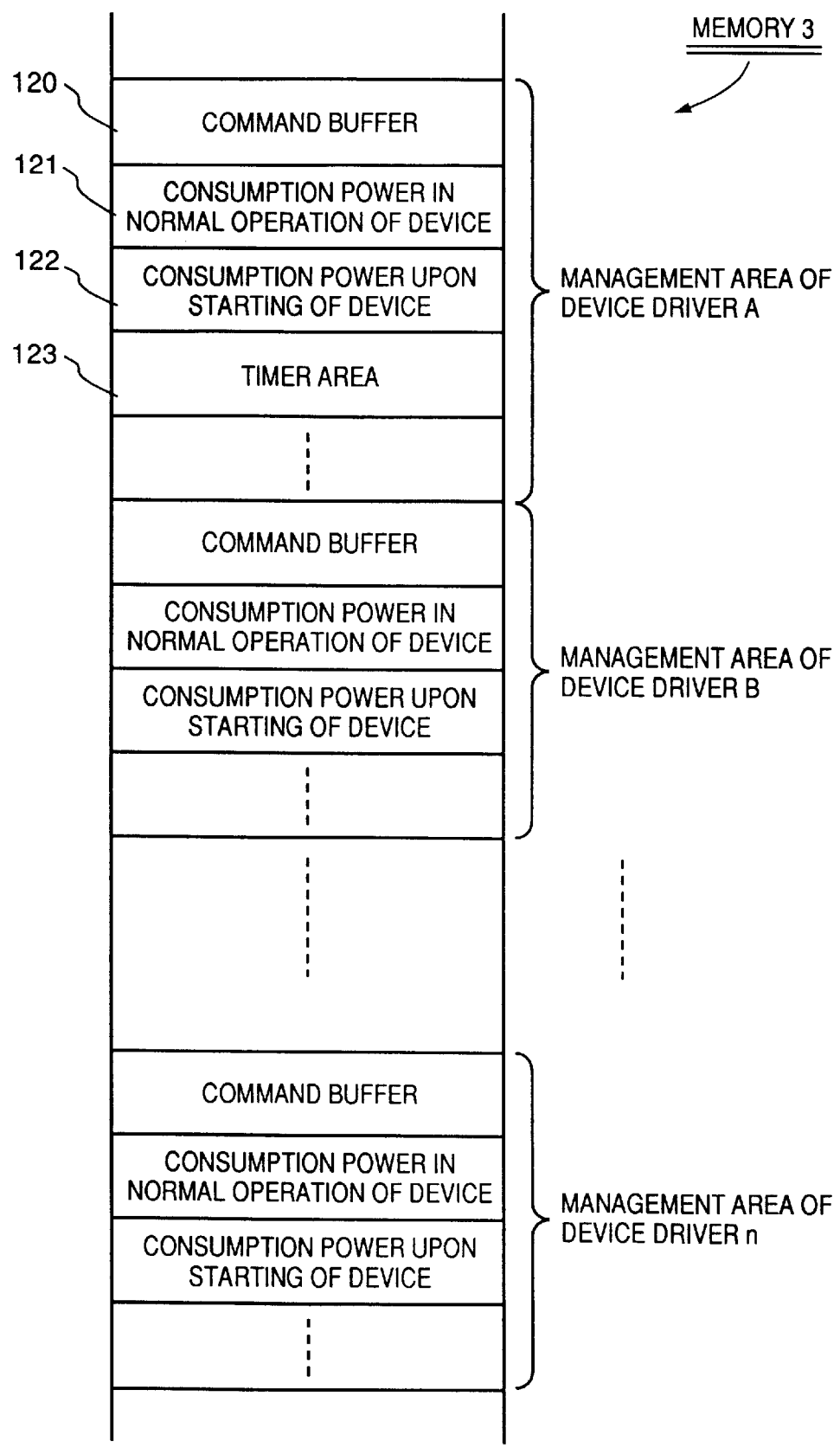
FIG. 12 is a view showing the management areas of device drivers in the information processing apparatus according to the second embodiment of the present invention.

In a memory area for each device driver, as shown in FIG. 12, a command buffer 120 for temporarily storing a command received in the power-saving mode, and a management area including an area 121 for storing the consumption power in a normal operation of a device, an area 122 for storing the consumption power upon start of a device, and the like are allocated in units of device drivers. Furthermore, in the management area of each device driver, a timer area 123 set with a timer value for measuring the time required until a device is stabilized after starting is allocated.

The processing of the second embodiment will be described below with reference to the flow charts in FIGS. 13 to 15.

Figure 13:
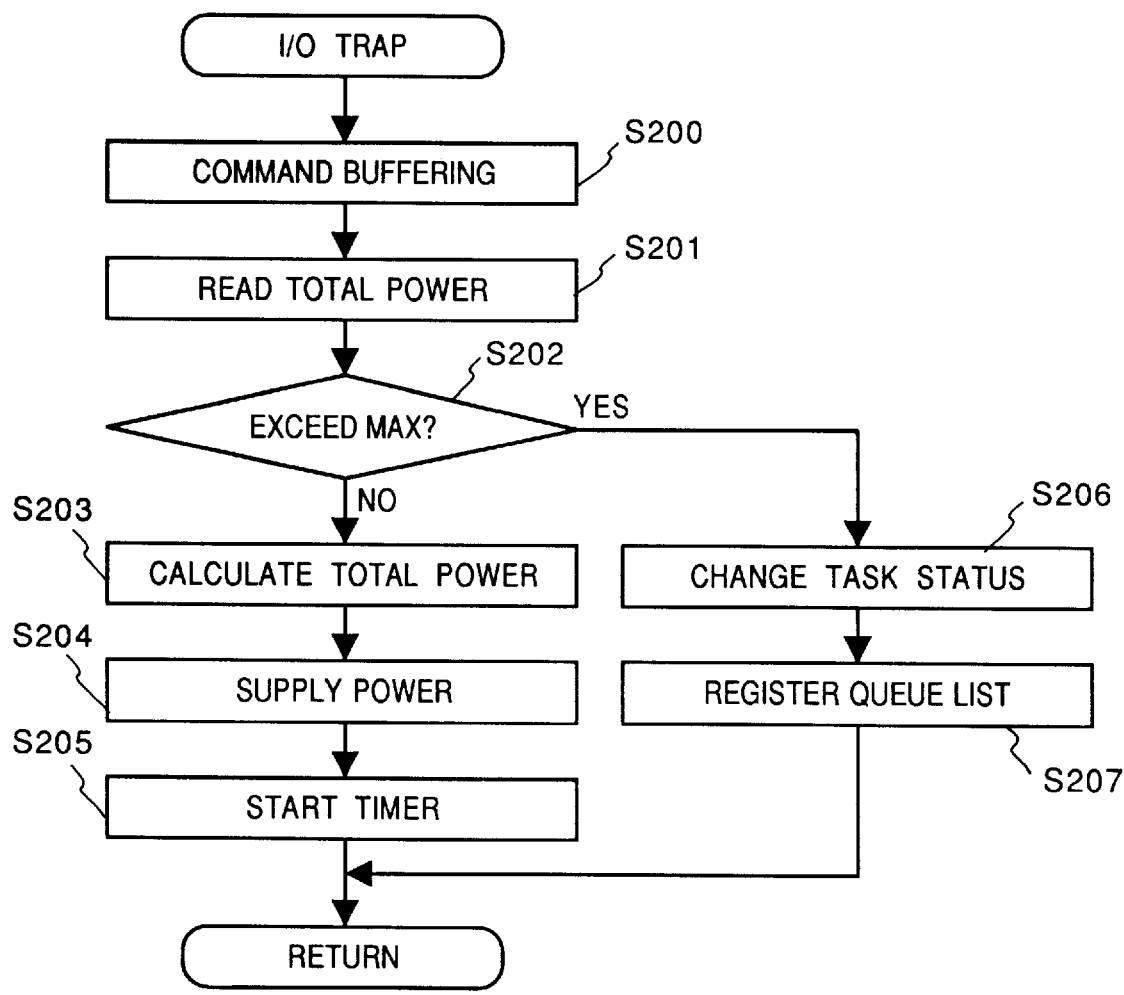
FIG. 13 is a flow chart showing start control of devices in the information processing apparatus according to the second embodiment of the present invention.

FIG. 13 is a flow chart showing the flow of I/O trap processing which is started when a task accesses a device in the power-saving mode.

In step S200, the contents of an access request to a desired device are stored in the command buffer 120. In step S201, the value of the total power register 110 indicating the total consumption power of the entire apparatus is loaded into the CPU 1. In step S202, the value of the area 122 indicating the consumption power upon starting of the device is added to the value of the total power register 110, and it is checked if the sum exceeds the value of the maximum (allowable) power register 111. If YES in step S202, the flow advances to step S206; otherwise, the flow advances to step S203.

In step S203, it is determined that the device can be started, and the value of the area 122 indicating the consumption power upon starting of the device is added to the value of the total power register 110. The flow then advances to step S204. In step S204, an instruction is supplied to the power supply controller 4 and a controller of the device, and a power supply voltage is supplied to the device. In step S205, a stabilization waiting timer of the device is reset, a time measurement value stored in the timer area 123 is set as a timer value, and the timer starts time measurement, thus ending processing.

On the other hand, in step S206, since it is determined that the device cannot be started, the task status 75 of the TCB of a task which issued the start request is switched to "event waiting" status. The flow advances to step S207, and the task is added to the device start queue list, thus ending processing.

Figure 14:
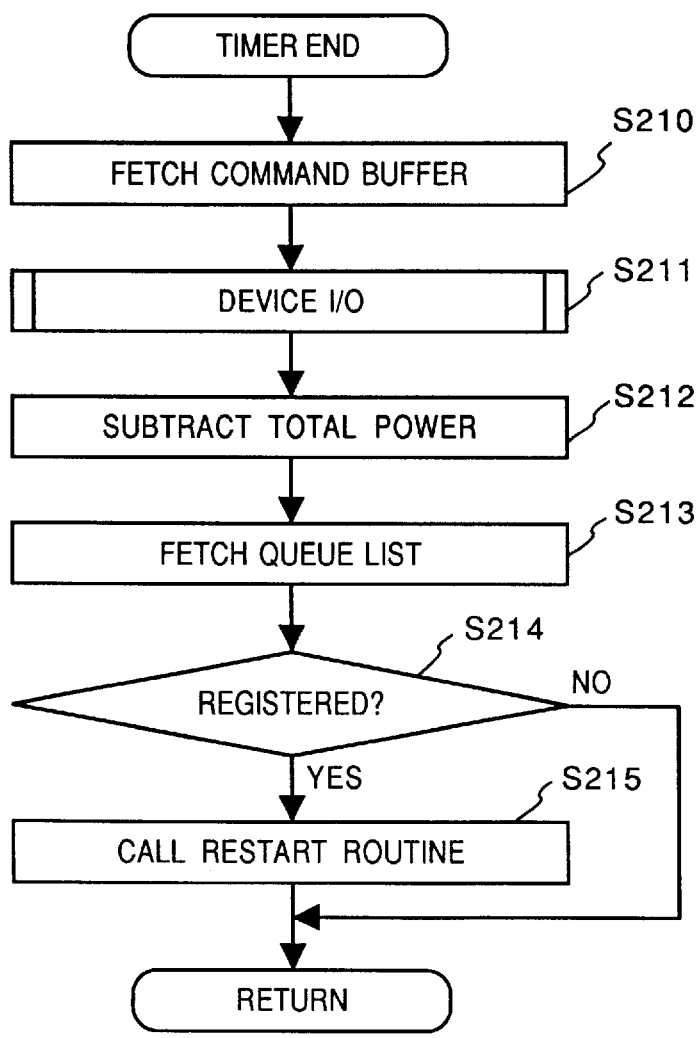
FIG. 14 is a flow chart showing control upon completion of measurement by a timer in the information processing apparatus according to the second embodiment of the present invention.

FIG. 14 is a flow chart showing the flow of interrupt processing generated upon completion of the time measurement by the stabilization waiting timer of the device. Note that the time measurement of the timer may be achieved by either a hardware circuit or a software program.

In step S210, a command for a desired device is fetched from the command buffer 120. In step S211, device I/O processing is performed in accordance with the command fetched in step S210. In step S212, the value of the area 122 indicating the consumption power upon starting of the device is subtracted from the value of the total power register 110, and the value of the area 121 indicating the consumption power in a normal operation of the device is added to the difference. In step S213, the first task in the device start queue list 112 is read. In step S214, it is checked if devices are registered in the device start queue list 112. If YES in step S214, the flow advances to step S215; otherwise, the processing ends. In step S215, the restart routine of a device registered in the device start queue list 112 is called, and the processing ends.

Figure 15:
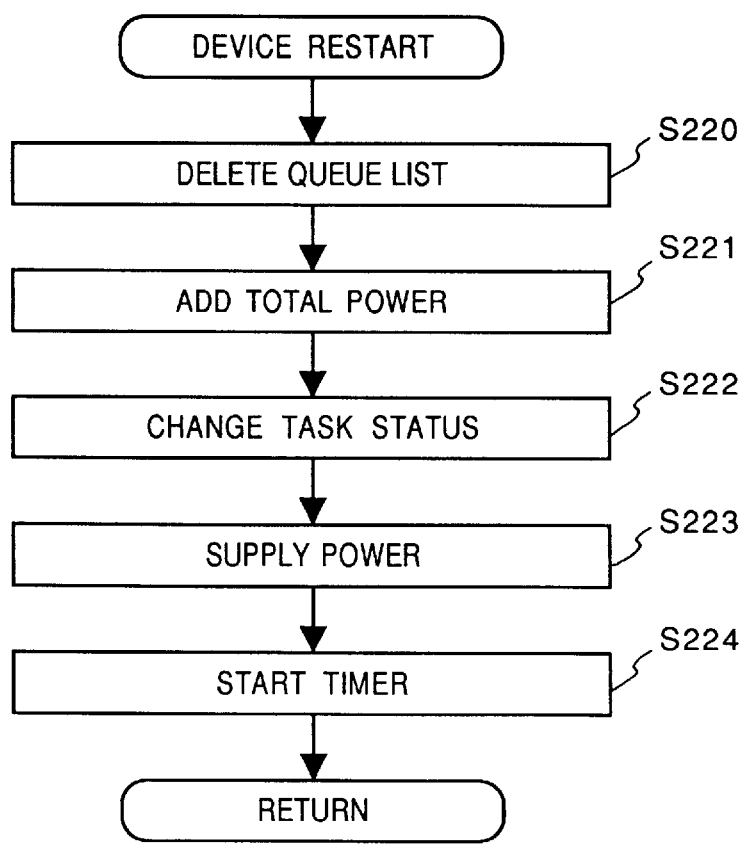
FIG. 15 is a flow chart showing restart control of a waiting device in the information processing apparatus according to the second embodiment of the present invention.

FIG. 15 is a flow chart showing the flow of processing for restarting a device registered in the start queue list 112.

In step S220, the ID 113 and the like of the corresponding device are deleted from the device start queue list 112. In step S221, the value of the area 122 indicating the consumption power upon starting the device is added to the value of the total power register 110. In step S222, the task status is changed to "executable". In step S223, an instruction is supplied to the power supply controller 4 and a controller of the device, and a power supply voltage is supplied to the device. In step S224, the stabilization waiting timer of the device is reset, a value in the timer area 123 is set in the timer, and the timer starts time measurement, thus ending processing.

The above-mentioned processing can prevent the total consumption power of a plurality of devices from exceeding the maximum consumption power of the apparatus when these devices are simultaneously started.

As described above, according to this embodiment, by detecting the consumption power of a device used by each task, the total consumption power of devices can be prevented from exceeding the maximum allowable power of the apparatus when a plurality of devices are simultaneously started. Thus, the peak current of the apparatus can be suppressed, and size reductions of the power supply and the apparatus can be realized, thus reducing the cost of the overall apparatus.

[Third Embodiment]

Figure 17:
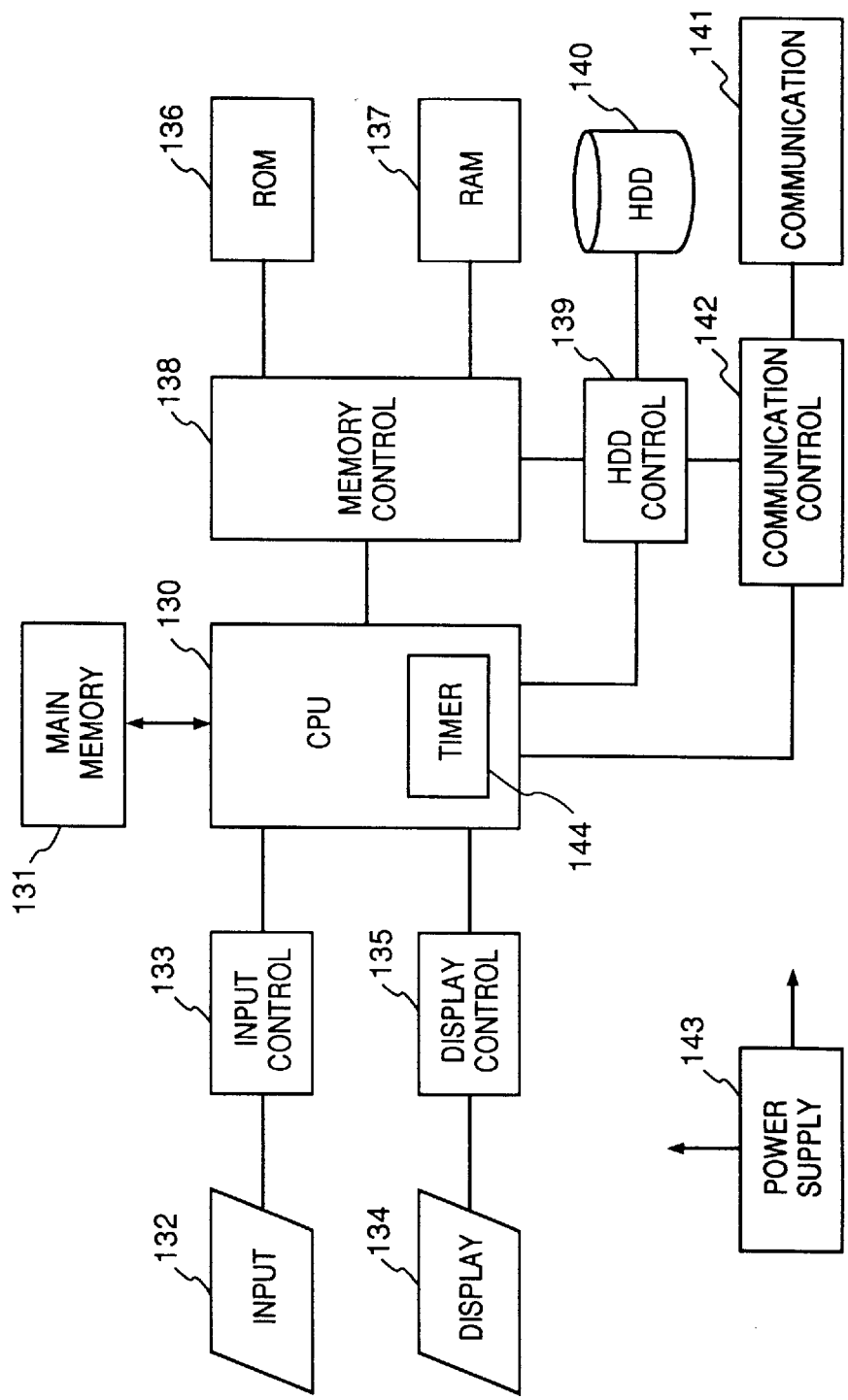
FIG. 17 is a block diagram showing the hardware arrangement of an electronic apparatus according to an embodiment of the present invention.

FIG. 17 is a block diagram showing the hardware arrangement of an electronic apparatus according to the third to sixth embodiments of the present invention.

Referring to FIG. 17, reference numeral 130 denotes a CPU, which controls the entire apparatus in accordance with a control program stored in a main memory 131. Reference numeral 132 denotes an input unit (input device), which comprises, e.g., a keyboard, and a pointing device such as a mouse, or the like. Reference numeral 133 denotes an input control circuit, which outputs various data input from the input unit 132 to the CPU 130. Reference numeral 134 denotes a display unit (display device) such as a liquid crystal display, a CRT, or the like, which displays data sent under the control of the CPU 130, under the control of a display control circuit 135. Reference numeral 136 denotes a ROM, which stores various data such as font data. Reference numeral 137 denotes a RAM which is used as a work area for temporarily storing various data by the CPU 130. Reference numeral 138 denotes a memory control circuit, which performs read/write control of the ROM 136 and the RAM 137, and controls data exchange with a hard disk control circuit 139. Reference numeral 140 denotes a hard disk drive unit (HDD); and 139, a hard disk control circuit for controlling data read/write accesses to the HDD 140. Reference numeral 141 denotes a communication unit (communication device) which exchanges data between the CPU 130 and a communication line via a communication control circuit 142. Reference numeral 143 denotes a power supply for supplying a power supply voltage to the entire apparatus including the above-mentioned units. Reference numeral 131 denotes a main memory, which stores a control program (the flow charts in FIGS. 22 and 23) executed by the CPU 130, and is also used as a work area upon execution of various control operations by the CPU 130. Reference numeral 144 denotes an internal timer of the CPU 130. The timer 144 starts time measurement upon power-ON of the apparatus, and measures the elapsed time, and the like.

The above-mentioned units can transit between two states, i.e., a mode H (high-power mode) and a mode L (low-power mode) under the control of respective control circuits. When each unit is used, it is set in the mode H; otherwise, it transits to the mode L. Upon transition from the mode H to L or vice versa, a certain time is required. In a transient state during the transition, some devices require power larger than that in their steady state. For this reason, when a given device must transit to the mode H immediately after it transits to the mode L, it is determined that the consumption power can be reduced if the device is kept in the mode H, and such a transition is not performed after all.

In the electronic apparatus of the third embodiment, when a device in the mode H is not accessed for a predetermined period of time, it is checked if a status transition to the mode L is to be made.

The status transition in the third embodiment will be explained below with reference to its example.

Figure 18:
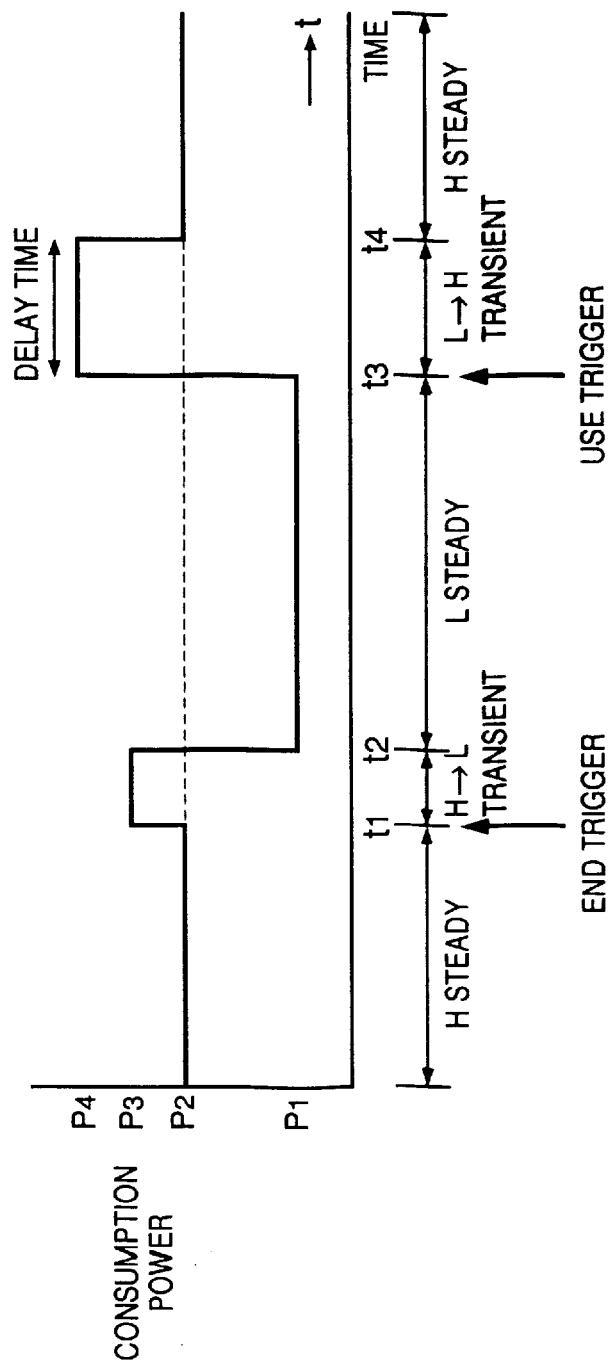
FIG. 18 is a timing chart showing the mode transition timings and changes in consumption power states in the third embodiment of the present invention.

FIG. 18 is a timing chart showing an example of the status transition. When a trigger indicating the end of use of a device is generated at time t1, a status transition to the mode L is started. The device is set in a steady state in the mode L at time t2 via a transient state from the mode H to L. Furthermore, a transition to the mode H is started in response to a use trigger accessed at time t3. The device is set in a steady state in the mode H at time t4 via a transient state of the transition from the mode L to H.

The consumption powers in the steady state in the mode L, the steady state in the mode H, the transient state from the mode H to L, and the transient state from the mode L to H are respectively represented by P1, P2, P3, and P4.

A consumption power W1 from time t1 to t4 upon execution of the above-mentioned status transition is given by:

$$W1 = P3 \times (t2-t1) + P1 \times (t3-t2) + P4 \times (t4-t3) \qquad (3)$$

On the other hand, a consumption power W2 from time t1 to t4 when no transition is made (indicated by a broken line in FIG. 18) is given by:

$$W2 = P2 \times (t4-t1) \qquad (2)$$

By calculating the two formulas, it can be determined which one of powers with and without a transition is larger. The consumption powers P1, P2, P3, and P4 in the above-mentioned states, and the times (t2−t1) and (t4−t3) required for status transitions are defined in units of devices.

If an end trigger is generated at time t1, time t3 is predicted at time t1, and whether or not a transition to the mode L is to be made is determined based on which result of two formulas (3) and (4) is larger. If time t3 at which a use trigger is generated satisfies formula (5) below, it is determined that a transition to the mode L is to be made after generation of an end trigger in the mode H to obtain a smaller consumption power; otherwise, it is determined that a transition to the mode L is not to be made even after generation of an end trigger in the mode H to obtain a smaller consumption power.

From $(t3 - t2) \times (P2 - P1) > (P3 - P2) \times$ (5)

$(t2 - t1) + (P4 - P2) \times (t4 - t3)$, $t3 > t2 + \{(P3 - P2) \times (t2 - t1) + (P4 - P2) \times (t4 - t3)\}/(P2 - P1)$ As described above, in the third embodiment, by predicting time t3 at time t1, whether or not a transition from the mode H to L is to be made is determined.

Figure 19:
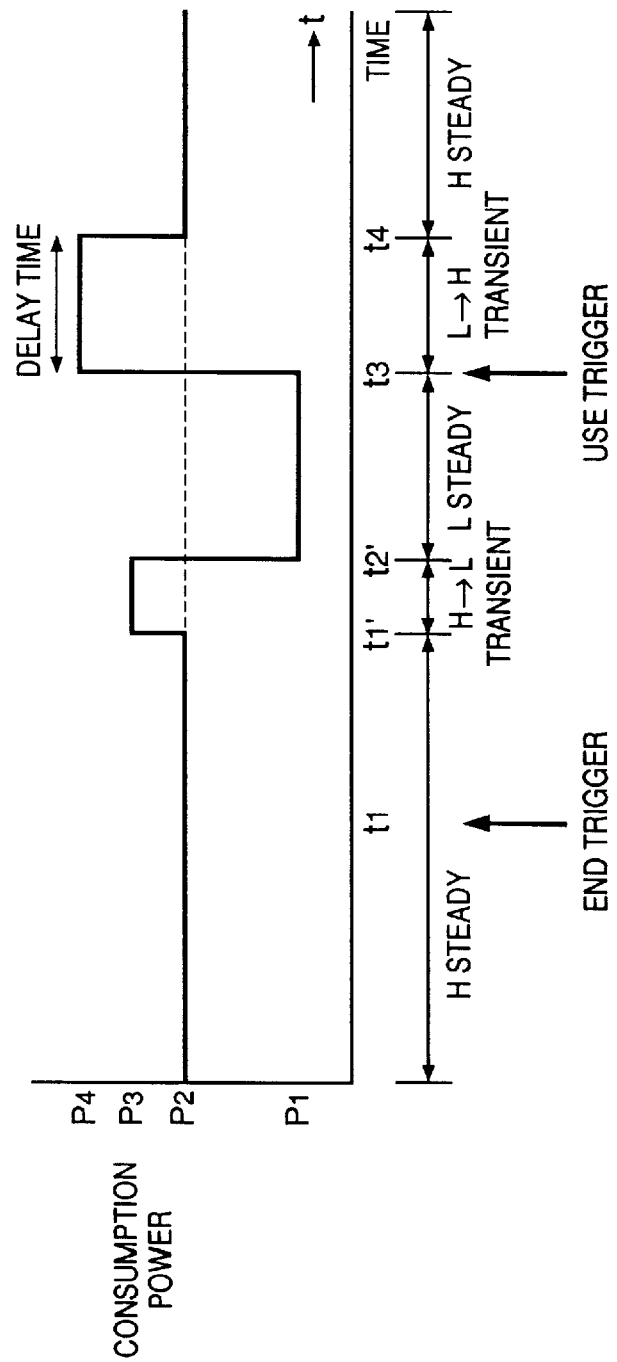
FIG. 19 is a timing chart for explaining conventional mode transition timings.

FIG. 19 is a timing chart for explaining conventional status transition. In this case, a status transition from the mode H to L is not made immediately after an end trigger is generated, but is made after an elapse of a time (t1'−t1). The status transition from the mode H to L is completed within a time (t2'−t1'), and thereafter, a status transition from the mode L to H is made in response to a use trigger generated at time t3.

As can be seen from a comparison between FIGS. 18 and 19, the time (t4−t1) between the generation timings of an end trigger in the mode H and a use trigger remains the same, but the consumption power of the conventional control is considerably larger than that in the third embodiment.

A case will be exemplified below wherein the above-mentioned principle is applied to a multi-task system. Assuming that an application A accesses a certain device once per a seconds, an application B accesses the device once per b seconds, and an application C accesses the device once per c seconds, the device is accessed at a rate of $\{(1/a)+(1/b)+(1/c)\}$ times per second. In other words, the device is accessed once per $1/\{(1/a)+(1/b)+(1/c)\}$ seconds.

Therefore, time t3 at which a use trigger is generated can be predicted to be:

$t3=t1+1/\{(1/a)+(1/b)+(1/c)\}$ (6)

By substituting time t3 in formula (5), whether or not a transition to the mode L is to be made is determined.

As shown in FIG. 20, time intervals (time elapsed from the previous access to the next access) of accesses made by applications to the respective devices such as the input unit 132, the display unit 134, the ROM 136, the RAM 137, the HDD 140, the communication unit 141, and the like are stored in the form of a table. The above-mentioned values a, b, c, and the like are determined in accordance with these access time intervals. The values in the table are updated by the following method every time applications (A to E) actually access the above-mentioned devices.

FIG. 21 shows the end times of previous accesses made by the respective applications to the respective devices. In FIG. 21, each end time is expressed by an absolute time (seconds) in accordance with the time (seconds) elapsed from the beginning of use of this system. In the following description, these times are similarly expressed.

Assuming that a certain application accesses a certain device, a value obtained by subtracting the time (the end time of the previous access) shown in FIG. 21 from the current time corresponds to the time interval until the current access. In order to more accurately predict an access time interval until the next access, not only the current time interval but also the previous time intervals are preferably used. For this reason, an average value between a time interval (a value obtained by subtracting the time in FIG. 21 from the current time) until an access to a certain device by a certain application, and a previous access time interval (the value shown in FIG. 20) to the device by the application is calculated, and the table value (FIG. 20) corresponding to the application and the device is updated using the calculated value as a new access time interval.

Upon completion of an access to a certain device by a certain application, the time value corresponding to the application and the device shown in FIG. 21 is updated to be the current time.

Figure 16:
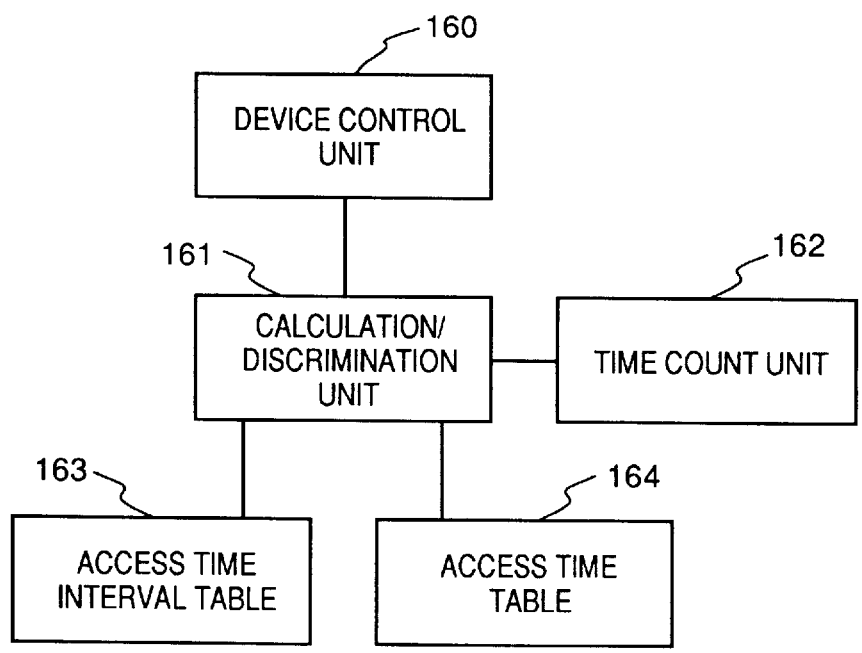
FIG. 16 is a functional block diagram showing an electronic apparatus according to the third embodiment of the present invention.

FIG. 16 is a functional block diagram of the third embodiment based on the above-mentioned functions.

Reference numeral 160 denotes a device control unit, which corresponds to the control circuits 133, 135, 138, 139, and 142 of the respective units shown in FIG. 17. Reference numeral 161 denotes a calculation/discrimination unit, which corresponds to the CPU 130, the main memory 131, and the like shown in FIG. 17. The calculation/discrimination unit 161 calculates the above-mentioned formulas, and discriminates based on the calculation result whether or not a status transition from the mode H to L is to be made. Reference numeral 162 denotes a time count unit, which corresponds to the timer 144 in FIG. 17, and measures the time (absolute time) elapsed from the beginning of the use of the electronic apparatus of the third embodiment. Reference numeral 163 denotes an access time interval table, which stores the access time intervals required when the applications access the respective units (devices) in the format shown in, e.g., FIG. 20. Reference numeral 164 denotes an access time table, which stores the absolute times at which previous accesses to the respective devices by the applications ended, as shown in FIG. 21. Items are added to the access time interval table 163 and the access time table 164 each time a new application is executed. Upon completion of the execution of the application, time information is stored in the access time table 164. In the calculation of formula (6), the item of the access time table corresponding to this application is not referred to. When this application is executed again, the current time measured by the time count unit 162 is stored in the access time table 164 corresponding to the application. Note that these tables 163 and 164 may be stored in the main memory 131, or may be stored in the ROM 136.

Figure 22:
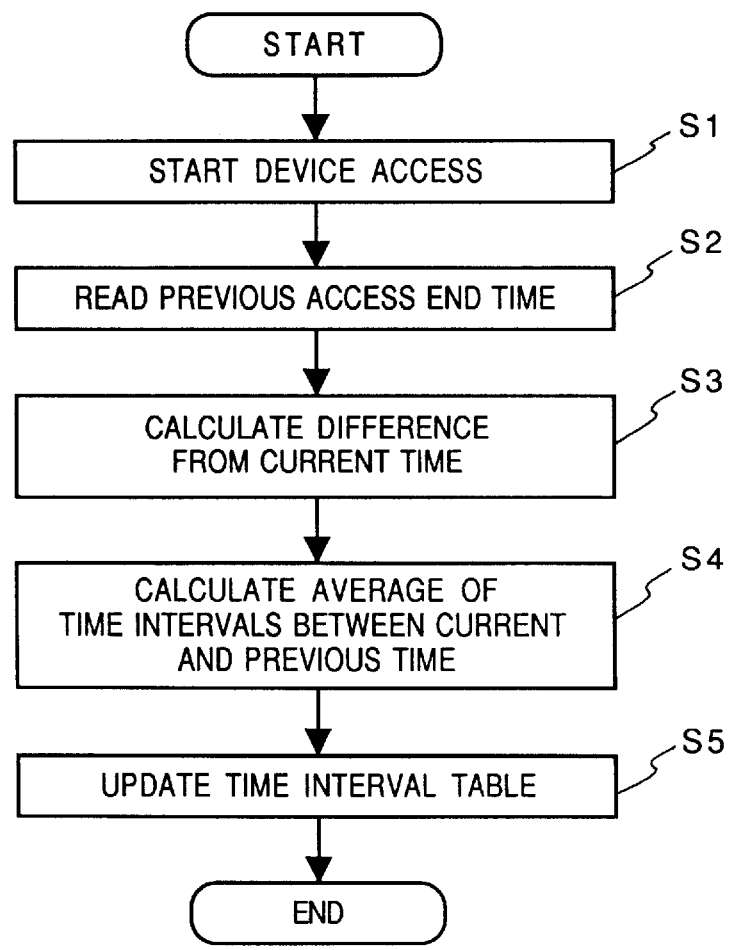
FIG. 22 is a flow chart showing the updating processing of the access time interval table upon device access in the third embodiment of the present invention.

The operation executed when a certain application accesses a certain device (e.g., the HDD 140) in the third embodiment will be described below using detailed numerical values with reference to the flow chart in FIG. 22. Note that the control program for executing this processing is stored in the main memory, and the CPU 130 executes the processing in accordance with the control program.

Assume that an application A accesses the HDD 140 at the absolute time of 3,600 seconds in step S1. The flow advances to step S2, the end time of the previous access to the HDD 140 by the application A is read from the access time table 164 shown in FIG. 21. In the case of the HDD 140, the mode H corresponds to the rotating state of a motor, and the mode L corresponds to the stop state of the motor. In FIG. 21, since the end time of the previous access is 3,592 seconds, in this case, the time elapsed from the end of the previous access by the application A to the current time is calculated by (3,600−3,592) in step S3. As a result of this calculation, the elapsed time is 8 seconds. The flow advances to step S4, and an average of the current access time interval (8 seconds) and the previous access time interval (the value stored in the table in FIG. 20; 20 seconds) is calculated. The flow then advances to step S5, and the calculated value is set in the access time interval table 163.

More specifically, since the time interval of the previous access to the HDD 140 by the application A is 20 seconds from FIG. 20, an average of 8 seconds described above and 20 seconds obtained from FIG. 20 is calculated, and the calculated value, "14 seconds", as the average value is determined as a new access time interval. Based on the determined value, the access time value of the HDD 140 by the application A in the access time table shown in FIG. 20 is updated from "20 seconds" to "14 seconds".

Figure 23:
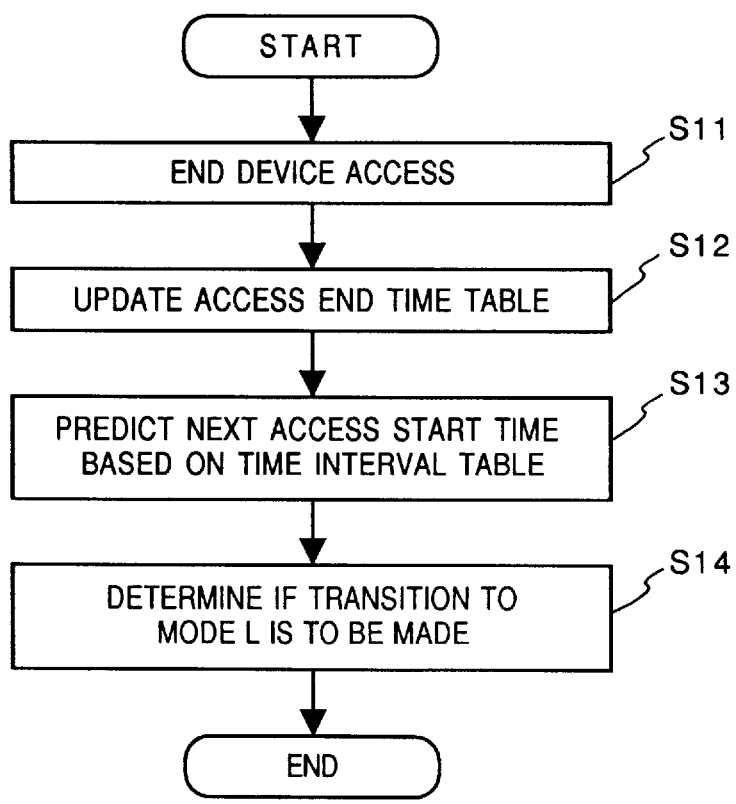
FIG. 23 is a flow chart showing the processing for determining if the control enters a mode L upon completion of an access to a device in the third embodiment of the present invention.

The operation executed upon completion of an access to a certain device by a certain application will be described below with reference to the flow chart in FIG. 23. This processing is also executed by the CPU 130, and a control program for executing this processing is stored in the main memory 131.

Assume that an access to the HDD 140 is completed at the current time of 3,602 seconds in step S11. The flow then advances to step S12, and the corresponding time in the access time table 164 is updated. More specifically, the end time of the access to the HDD 140 by the application A in the table shown in FIG. 21 is updated from "3,592" to "3602". The flow advances to step S14, and time t3 is calculated using the following formula based on formula (4) described above:

$$t3 = t1 + 1/\{(1/a) + (1/b) + (1/c) + (1/d) + (1/e)\} \quad (5)$$

Note that t1=3,602 seconds.

As described above, a has already been updated from "20" to "14". On the other hand, b to e are respectively b=30, c=30, d=300, and e=1,800 from FIG. 20. Therefore, t3 is about 3,609 seconds. Thus, t3=3,609 is substituted in formula (5) above, and when t3 satisfies formula (5), the HDD 140 is controlled to transit to the mode L; otherwise, transition to the mode L is not performed.

In the conventional method, as shown in FIG. 19 described above, the control waits for a predetermined period of time (t1') from the end trigger (t1) of the device, and if no use trigger is generated during this interval, the device is controlled to transit to the mode L.

In contrast to this, in the third embodiment, when the device is controlled to transit to the mode L at time t1, the power of (P2−P1)×(t1'−t1) can be saved.

Note that formula (6) means that as a larger number of applications with short access intervals are executed simultaneously, the value t3 becomes smaller. Therefore, in such a case, formula (5) is relatively hard to satisfy, and as a result, transitions to the mode L rarely occur. Therefore, the influence of the transient state during a transition on the consumption power and delay time can be suppressed.

In the third embodiment, upon completion of an access to a certain device, whether or not a transition to the low-power mode is to be made is determined without waiting for an elapse of a predetermined period of time. For this reason, the low-power mode can be efficiently set, and a power-down function can be realized.

[Fourth Embodiment]

In the fourth embodiment, a hysteresis of intervals between the previous accesses and the next accesses to a certain device is recorded. The consumption power W1 (t3) at time t3 in each of past n accesses is calculated using formula (3), and these values are averaged to obtain an expected value W3 of the consumption power.

$$W3 = \{\Sigma(P3 \times (t2-t1) + P1 \times (t3-t2) + P4 \times (t4-t3))\}/n \quad (8)$$

where Σ is the sum of n consumption powers.

Formulas (4) and (8) are calculated, and whether or not a transition to the mode L is to be made is determined by comparing the calculated values. If W3<W2, a transition is made, otherwise, a transition is not made.

In formula (8) above, since the values P1, P3, P4, (t2−t1), and (t4−t3) are defined in units of devices, a table for storing values (t3−t2) (the time in the mode L) upon accesses to devices in correspondence with applications is prepared, as shown in FIG. 24.

In this manner, the expected values of the consumption powers with and without status transitions from the mode H to L are compared, and whether or not a transition is to be made is determined based on the comparison result. As a result, a possibility of selecting a transition with a smaller consumption power can be increased.

[Fifth Embodiment]

The hard disk drive (HDD) 140 is normally accessed as a file. Also, the HDD 140 is accessed as, e.g., a virtual memory for the purpose of saving the memory contents. Therefore, the access time interval of the HDD varies depending on states, i.e., if a file is open, if the virtual memory is enabled, and so on. FIG. 25 shows an example of access time intervals in such states.

As can be seen from FIG. 25, the access time interval of the HDD 140 when the virtual memory is ON is shorter than that when the virtual memory is OFF, and the access time interval when a file is open is considerably shorter than that when a file is closed.

Using FIG. 25 as a time interval table, whether or not a status transition is to be made is determined as in the third embodiment. Other devices may often be accessed as a file, and the same applies to these devices.

According to the fifth embodiment, the access time interval of a device can be predicted not only in units of applications but also in correspondence with the time intervals in units of system status.

[Sixth Embodiment]

In FIG. 18 described above, if the delay time required for the status transition from when a use trigger is input at time t3 until the device can be actually used at time t4 is long, a user must wait for a relatively long period of time, thus adversely influencing operability.

Figure 26:
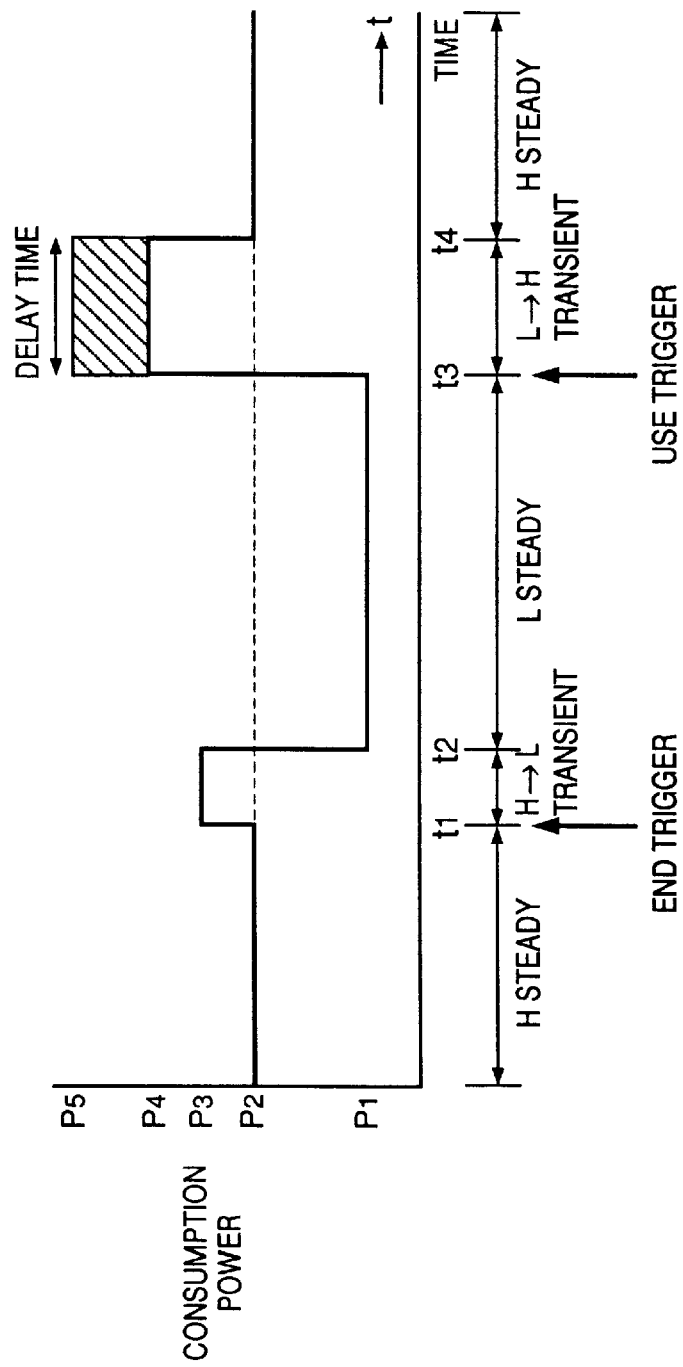
FIG. 26 is a timing chart showing changes in consumption power states upon transitions of modes according to the sixth embodiment of the present invention.

As shown in the timing chart in FIG. 26, an imaginary consumption power is added to the actual consumption power P4 in the transient state from the mode L to the mode H, and the sum is represented by P5. Whether or not a transition to the mode L is to be made is determined using formula (9) below in place of formula (5) above:

$$t3 > t2 + \{(P3-P2) \times (t2-t1) + (P5-P2) \times (t4-t3)\}/(P2-P1) \quad (9)$$

Since P5>P4, a possibility that inequality (9) is satisfied is lower than that for formula (5), and transitions to the mode L rarely take place.

The sixth embodiment is effective when a high-speed transition from the mode L to the mode H is required at the cost of a slight increase in consumption power.

By adjusting the value P5, a trade-off between the consumption power and the status transition speed from the mode L to H can be adjusted.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for time-divisional execution of a plurality of tasks, comprising:

scheduling means for scheduling an execution order of each task of the plurality of tasks in time division, on the basis of the power required by each task to perform the task;

storage means for storing device power requirement information of all devices connected to the information processing apparatus and for storing the power required to perform each task; and execute means for executing each task of the plurality of tasks in accordance with the schedule determined by said scheduling means;

wherein said scheduling means schedules so that the task that requires the most power has the highest execution order priority.

2. The apparatus according to claim 1, further comprising power supply control means for decreasing power to be supplied to a device which has not been accessed for not less than a predetermined period of time.

3. The apparatus according to claim 2, further comprising means for, when a current task issues an access request to the device to which the decreased power is supplied, canceling the decrease in power supplied to the device by said power supply control means.

4. An information processing apparatus for executing a plurality of tasks, comprising:

storage means for storing a consumption power and an actuating consumption power upon starting a device whereby each device may be used by any task;

current power storage means for storing a total consumption power of devices being used by a current task;

calculation means for, when a new device is requested to be actuated by the current task, adding the actuating consumption powers of the new device stored in said storage means and the total consumption power stored in said current power storage means, so as to obtain an actuating total consumption power;

determination means for determining whether or not the actuating total consumption power calculated by said calculation means is not more than a maximum allowable power of the information processing apparatus; and control means for controlling to permit the use of the new device by the current task, in a case where said determination means determines that the actuating total consumption power calculated by said calculating means is not more than the maximum allowable power of the information processing apparatus, and for controlling to delay usage of the new device by the current task, in a case where said determination means determines that the actuating total consumption power calculated by said calculating means is more than the maximum allowable power of the information processing apparatus.

5. The apparatus according to claim 4, wherein when the use of a given device by the task ends, said calculation means reads out the consumption power of the device, the use of which has ended, from said storage means, and subtracts the readout consumption power from the total consumption power to update the total consumption power.

6. The apparatus according to claim 4, wherein, in a case where said determination means determines that the actuating total consumption power calculated by said calculation means is more than the maximum allowable power of the information processing apparatus, said control means registers the new device into a waiting list.

7. The apparatus according to claim 6, wherein when the task begins to use a given device, said calculation means reads out the consumption power upon actuating of the device from said storage means, and adds the readout consumption power to the total consumption power.

8. The apparatus according to claim 6, further comprising time measurement means for measuring a time required for actuating the device.

9. The apparatus according to claim 8, when time measurement by said time measurement means ends, said calculation means subtracts the consumption power upon starting of the device from the actuating total consumption power and obtains an updated total consumption power, and reads out the consumption power in a normal operation of the device from said storage means, and adds a read consumption power to the updated total consumption power.

10. The apparatus according to claim 8, wherein, when the updated total consumption power becomes small, and it is ready to actuate a waiting device registered in the waiting list, said control means starts the usage of the waiting device.

11. A processing method in an information processing apparatus for time-divisionally executing a plurality of tasks, comprising the steps of:

scheduling an execution order of each task of the plurality of tasks on the basis of the power required by each task to perform the task;

calculating a total consumption power of devices accessed by each of the plurality of tasks; and executing each task of the plurality of tasks in accordance with the execution order scheduled in said scheduling step, wherein the task having the largest total consumption power is executed with the highest priority.

12. The method according to claim 11, further comprising the step of decreasing power to be supplied to a device which is not accessed for not less than a predetermined period of time.

13. The method according to claim 12, further comprising the step of canceling the decrease in power supplied to the device when a task issues an access request to the device to which the decreased power is supplied.

14. A processing method in an information processing apparatus for executing a plurality of tasks in time division, comprising the steps of:

calculating a current total consumption power of devices used by a current task;

obtaining an actuating consumption power upon actuating a new device in a case where the new device is requested to be actuated by the current task;

calculating an actuating total consumption power based on the current total consumption power and the actuating consumption power upon actuating the new device;

determining whether or not the actuating total consumption power is not more than the maximum allowable power of the information processing apparatus; and permitting the use of the new device by the current task when it is determined that the actuating total consumption power is not more than the maximum allowable power of the information processing apparatus, and controlling to delay usage of the new device when it is determined that the actuating total consumption power is more than the maximum allowable power of the information processing apparatus.

15. The method according to claim 14, further comprising the step of subtracting the consumption power of a device, the use of which has ended, from the total consumption power when the use of the device by the task ends to update the total consumption power.

16. The method according to claim 14, wherein, in a case where the actuating total consumption power is more than the maximum allowable power of the information processing apparatus, the new device is registered into a waiting list in said permitting step.

17. The method according to claim 16, further comprising the step of adding the consumption power upon actuating of a given device, the use of which has begun, to the total consumption power when the current task begins to use the given device.

18. The method according to claim 16, further comprising the step of measuring a time required for actuating the device.

19. The method according to claim 18, further comprising the step of subtracting the consumption power upon actuating of the device from the actuating total consumption power and obtaining an updated total consumption power, upon completion of measurement of the the time required for actuating of the device, and adding the consumption power in a normal operation of the device to the updated total consumption power.

20. The method according to claim 16, further comprising the step of actuating a waiting device in the waiting list when the total consumption power of the current task becomes small and it is ready to actuate the waiting device.

21. An information processing apparatus for executing a plurality of applications, comprising:

storage means for storing access time intervals of devices in units of applications;

prediction means for, upon completion of an access to a device by a current application, predicting the next access time of the current application to the device on the basis of the access time intervals stored in said storage means;

determination means for determining whether or not the device is set in a low-power mode based on the next access time of the device predicted by said prediction means; and low-power operation means for operating the device in the low-power mode on the basis of a determination result of said determination means.

22. The apparatus according to claim 21, wherein the device includes at least one unit of an input unit, a display unit, and an external storage device.

23. The apparatus according to claim 21, further comprising time storage means for storing an access end time to the device, and calculating means for calculating a time interval based on a difference between the access end time stored in said time storage means and a time when the device has been next accessed by the current application, and for updating the access time interval of the device stored in said storage means with reference to the time interval calculated by said calculating means.

24. The apparatus according to claim 21, wherein said determination means compares a first energy which is saved while the device is in the low-power mode until the next access time predicted by said prediction means, with a second energy as an extra energy due to a status transition from a normal state to the low-power mode and a status transition from the low-power mode to the normal state of the device, and said low-power operation means operates the device in the low-power mode when the first energy is larger than the second energy.

25. The apparatus according to claim 21, wherein said determination means compares a first consumption power expected value until the next access time predicted by said prediction means, which is obtained when the device operates in the low-power mode, with a second consumption power until the next access time, which is obtained when the device does not operate in the low-power mode, and said low-power operation means operates the device in the low-power mode when the first consumption power is larger than the second consumption power.

26. The apparatus according to claim 21, wherein said storage means further stores access time intervals in correspondence with states of the device.

27. The apparatus according to claim 24, wherein said determination means virtually increases the second energy to decrease a probability of transitions from the normal operation to the low-power mode.

28. A power supply control method in an information processing apparatus for executing a plurality of applications, comprising the steps of:

predicting, upon completion of an access to a device by a current application, a next access time of the current application to the device on the basis of an access time interval of the device stored in a memory, the memory stores an access time interval of each device in a unit of each application;

determining whether or not the device is to be set in a low-power mode based on the next access time of the device predicted in said predicting step; and operating the device in the low-power mode on the basis of a determination result in said determining step.

29. The method according to claim 28, wherein the device includes at least one unit of an input unit, a display unit, and an external storage device.

30. The method according to claim 28, further comprising the step of storing an access end time to the device, and calculating a time interval based on a difference between the access end time and a time when the device has been next accessed by the application, and updating the access time interval stored in the memory with reference to the calculated time interval.

31. The method according to claim 28, wherein the determining step includes the step of comparing a first energy which is saved while being in the low-power mode until the next access time predicted in said predicting step, with a second energy as an extra energy due to a status transition from a normal state to the low-power mode and a status transition from the low-power mode to the normal state, and determining that the low-power mode is to be set when the first energy is larger than the second energy.

32. The method according to claim 28, wherein the determination step includes the step of comparing a first consumption power expected value until the next access time predicted in said predicting step, which is obtained when the device operates in the low-power mode, and a second consumption power until the next access time, which is obtained when the device does not operate in the low-power mode, and determining that the device operates in the low-power mode when the first consumption power is larger than the second consumption power.

* * * * *

UNITED STATES PATENT AND TRADEMARK OFFICE
CERTIFICATE OF CORRECTION

PATENT NO. : 5,828,568

DATED : October 27, 1998

INVENTOR(S): SHINICHI SUNAKAWA ET AL.            Page 1 of 3

It is certified that error appears in the above-identified patent and that said Letters Patent is hereby corrected as shown below:  On the title page: Item

[56] REFERENCES CITED AT U.S. PATENT DOCUMENTS

"4,612,518" should read --4,612,418--.

[56] REFERENCES CITED AT OTHER PUBLICATIONS

Insert: --IBM TECHNICAL DISCLOSURE BULLETIN, Vol. 32, No. 8B, January 1990, p. 373, "Dynamic Power Management By Clock Speed Variation." IBM TECHNICAL DISCLOSURE BULLETIN, Vol. 35, No. 5, October 1992, pp. 425-427, "Technique For Power Management In Signal Processors."--.

COLUMN 2

Line 52, "suffers" should read --suffers from--.

COLUMN 7

Line 65, "I/O unit" should read --I/O unit--.

COLUMN 14

Line 59, "(2)" should read --(4)--.

COLUMN 17

Line 28, "(5)" should read --(7)--.
Line 35, "(5)" (both occurrences) should read --(7)--.
Line 49, "(5)" should read --(7)--.

UNITED STATES PATENT AND TRADEMARK OFFICE
CERTIFICATE OF CORRECTION

PATENT NO. : 5,828,568

DATED : October 27, 1998

INVENTOR(S) : SHINICHI SUNAKAWA ET AL.

It is certified that error appears in the above-identified patent and that said Letters Patent is hereby corrected as shown below:

COLUMN 18

Line 48, "(5)" should read --(7)--.
    Line 52, "(5)" should read --(7)--.

COLUMN 20

Line 6, "when" should read --wherein when--.

COLUMN 21

Line 18, "the the" should read --the--.
    Line 31, "application," should read --given application,--; and "the" should read --a--.
    Line 41, "of" should read --provided by--.
    Line 43, "of" should read --from among--.

COLUMN 22

Line 26, "in a unit" should read --application by application, for--.
    Line 27, "of" should be deleted.
    Line 32, "in" should read --obtained in--.
    Line 34, "of" should read --from among--.

UNITED STATES PATENT AND TRADEMARK OFFICE
CERTIFICATE OF CORRECTION

PATENT NO.   : 5,828,568

DATED        : October 27, 1998

INVENTOR(S): SHINICHI SUNAKAWA ET AL.

It is certified that error appears in the above-identified patent and that said Letters Patent is hereby corrected as shown below:

<u>COLUMN 22 CONTINUED</u>

Line 53, "determination" should read --determining--.

Signed and Sealed this

Twenty-second Day of February, 2000

Attest:

Q. TODD DICKINSON

Attesting Officer

Commissioner of Patents and Trademarks